US011651321B2

(12) United States Patent
Sankaran et al.

(10) Patent No.: US 11,651,321 B2
(45) Date of Patent: *May 16, 2023

(54) SECURE SHIPPING INTERACTIONS USING BLOCKCHAINS

(71) Applicant: eBay Inc., San Jose, CA (US)

(72) Inventors: Nambi Sankaran, Sunnyvale, CA (US); Constanza Maria Heath, Cannon Beach, OR (US); Someshekhar Banerjee, Pleasanton, CA (US); David John Kamalsky, Campbell, CA (US); Abhishek Pandey, San Jose, CA (US); Mikhail Tsirelson, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,431

(22) Filed: Aug. 23, 2022

(65) Prior Publication Data

US 2023/0059581 A1 Feb. 23, 2023

Related U.S. Application Data

(63) Continuation of application No. 16/458,645, filed on Jul. 1, 2019, now Pat. No. 11,468,390.

(Continued)

(51) Int. Cl.
*G06Q 10/0832* (2023.01)
*G06Q 10/0833* (2023.01)
(Continued)

(52) U.S. Cl.
CPC ..... *G06Q 10/0832* (2013.01); *G06F 16/1824* (2019.01); *G06F 16/2379* (2019.01);
(Continued)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 5,831,860 A 11/1998 Foladare et al.
7,130,771 B2 10/2006 Aghassipour
(Continued)

FOREIGN PATENT DOCUMENTS

CN 202979284 6/2013
CN 103258359 A 8/2013
(Continued)

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), 2017, pp. 15-1509, doi: 10.1109/PST.2017.00013. (Year: 2017).*
(Continued)

*Primary Examiner* — Emmett K. Walsh
(74) *Attorney, Agent, or Firm* — FIG. 1 Patents

(57) ABSTRACT

Technologies are shown for securing private information during shipping of an item storing shipping information at a blockchain address that includes a recipient geolocation address and generating a shipping label that includes a machine-readable pointer to the blockchain address. The label can be scanned to obtain the blockchain address and request the shipping information. In response to a request, the recipient geolocation address or a next intermediate shipper can be provided. The recipient can be notified to obtain authorization to release the recipient geolocation address or provide an alternative geolocation for delivery.

20 Claims, 21 Drawing Sheets

Related U.S. Application Data

(60) Provisional application No. 62/825,710, filed on Mar. 28, 2019.

(51) Int. Cl.

| | | |
|---|---|---|
| *G06Q 10/0835* | (2023.01) | |
| *H04L 9/06* | (2006.01) | |
| *G06K 19/07* | (2006.01) | |
| *G06F 16/182* | (2019.01) | |
| *G06Q 20/38* | (2012.01) | |
| *G06Q 50/28* | (2012.01) | |
| *G06K 7/14* | (2006.01) | |
| *H04L 9/32* | (2006.01) | |
| *G06F 16/23* | (2019.01) | |
| *G06F 16/955* | (2019.01) | |
| *G06Q 20/40* | (2012.01) | |
| *G06Q 30/08* | (2012.01) | |
| *H04L 9/08* | (2006.01) | |
| *G06Q 10/0834* | (2023.01) | |
| *G06Q 30/0283* | (2023.01) | |
| *H04L 9/00* | (2022.01) | |

(52) U.S. Cl.
CPC ......... *G06F 16/955* (2019.01); *G06K 7/1408* (2013.01); *G06K 19/0717* (2013.01); *G06Q 10/0833* (2013.01); *G06Q 10/0835* (2013.01); *G06Q 10/08345* (2013.01); *G06Q 10/08355* (2013.01); *G06Q 20/382* (2013.01); *G06Q 20/3825* (2013.01); *G06Q 20/4014* (2013.01); *G06Q 30/0283* (2013.01); *G06Q 30/08* (2013.01); *G06Q 50/28* (2013.01); *H04L 9/0637* (2013.01); *H04L 9/0643* (2013.01); *H04L 9/0869* (2013.01); *H04L 9/3242* (2013.01); *H04L 9/3263* (2013.01); *H04L 9/50* (2022.05)

(56) References Cited

U.S. PATENT DOCUMENTS

| | | | |
|---|---|---|---|
| 7,624,024 | B2 | 11/2009 | Levis et al. |
| 7,647,231 | B2 | 1/2010 | Kuebert et al. |
| 8,412,489 | B2 | 4/2013 | Kadaba |
| 9,436,923 | B1 | 9/2016 | Sriram et al. |
| 9,760,854 | B1 | 9/2017 | Chowdhary |
| 9,767,426 | B2 | 9/2017 | Siegel et al. |
| 9,830,571 | B2 | 11/2017 | Betancourt |
| 9,849,364 | B2 | 12/2017 | Tran et al. |
| 9,857,188 | B1 | 1/2018 | O'Hare et al. |
| 10,102,526 | B1 | 10/2018 | Madisetti et al. |
| 10,643,171 | B1 | 5/2020 | Zhang |
| 10,721,060 | B1 | 7/2020 | Kaizer et al. |
| 2002/0165729 | A1 | 11/2002 | Kuebert et al. |
| 2003/0125963 | A1 | 6/2003 | Haken |
| 2003/0163378 | A1 | 8/2003 | Podgurny et al. |
| 2003/0173405 | A1 | 9/2003 | David et al. |
| 2004/0254893 | A1 | 12/2004 | Tsuei et al. |
| 2005/0052284 | A1 | 3/2005 | Schmidtberg et al. |
| 2005/0259658 | A1 | 11/2005 | Logan et al. |
| 2006/0282277 | A1 | 12/2006 | Ng |
| 2007/0210916 | A1 | 9/2007 | Ogushi et al. |
| 2008/0052044 | A1 | 2/2008 | Shoenfeld |
| 2008/0111674 | A1 | 5/2008 | Quine |
| 2009/0303052 | A1 | 12/2009 | Aklepi et al. |
| 2010/0164686 | A1 | 7/2010 | Johnson |
| 2010/0299640 | A1 | 11/2010 | Titus |
| 2011/0258130 | A1 | 10/2011 | Grabiner |
| 2012/0023555 | A1 | 1/2012 | Putterman |
| 2012/0106859 | A1 | 5/2012 | Cheatle |
| 2012/0173448 | A1 | 7/2012 | Rademaker |
| 2012/0235791 | A1 | 9/2012 | Donlan et al. |
| 2014/0035721 | A1 | 2/2014 | Heppe et al. |
| 2014/0180959 | A1 | 6/2014 | Gillen et al. |
| 2014/0244537 | A1 | 8/2014 | Jani et al. |
| 2014/0266712 | A1 | 9/2014 | Bobo et al. |
| 2014/0372334 | A1 | 12/2014 | Wrentmore |
| 2014/0379603 | A1 | 12/2014 | Bodenhamer et al. |
| 2015/0046361 | A1 | 2/2015 | Williams et al. |
| 2015/0046364 | A1 | 2/2015 | Kriss |
| 2015/0154559 | A1 | 6/2015 | Barbush et al. |
| 2015/0382085 | A1 | 12/2015 | Lawrie-fussey et al. |
| 2016/0042317 | A1 | 2/2016 | Goodman et al. |
| 2016/0063433 | A1 | 3/2016 | Glasgow et al. |
| 2016/0098730 | A1 | 4/2016 | Feeney et al. |
| 2016/0260059 | A1 | 9/2016 | Benjamin et al. |
| 2016/0350712 | A1 | 12/2016 | Wesemann et al. |
| 2017/0180134 | A1 | 1/2017 | King |
| 2017/0109696 | A1 | 4/2017 | Serjeantson et al. |
| 2017/0121021 | A1 | 5/2017 | Bonazzoli et al. |
| 2017/0147976 | A1 | 5/2017 | Koch et al. |
| 2017/0180128 | A1 | 6/2017 | Lu |
| 2017/0221052 | A1 | 8/2017 | Sheng et al. |
| 2017/0229000 | A1 | 8/2017 | Law |
| 2017/0243213 | A1 | 8/2017 | Castinado et al. |
| 2017/0257358 | A1 | 9/2017 | Ebrahim et al. |
| 2017/0262790 | A1 | 9/2017 | Khasis |
| 2017/0270472 | A1 | 9/2017 | High et al. |
| 2017/0286901 | A1 | 10/2017 | Skaff et al. |
| 2017/0329980 | A1 | 11/2017 | Hu et al. |
| 2017/0344988 | A1 | 11/2017 | Cusden et al. |
| 2018/0024554 | A1 | 1/2018 | Brady et al. |
| 2018/0096175 | A1 | 4/2018 | Schmeling et al. |
| 2018/0097635 | A1 | 4/2018 | Moses |
| 2018/0158020 | A1 | 6/2018 | Khasis |
| 2018/0167198 | A1 | 6/2018 | Muller et al. |
| 2018/0174093 | A1* | 6/2018 | Perez .................. G06F 16/9537 |
| 2018/0174097 | A1 | 6/2018 | Liu et al. |
| 2018/0220278 | A1 | 8/2018 | Tai et al. |
| 2018/0232693 | A1 | 8/2018 | Gillen et al. |
| 2018/0253691 | A1 | 9/2018 | High et al. |
| 2018/0255131 | A1 | 9/2018 | Stöcker et al. |
| 2018/0264347 | A1 | 9/2018 | Tran et al. |
| 2018/0276611 | A1 | 9/2018 | Dromerhauser et al. |
| 2018/0343114 | A1 | 11/2018 | Ben-ari |
| 2018/0349896 | A1 | 12/2018 | Arora et al. |
| 2019/0006037 | A1 | 1/2019 | Jacobs et al. |
| 2019/0012637 | A1 | 1/2019 | Gillen |
| 2019/0014116 | A1 | 1/2019 | Khi et al. |
| 2019/0019144 | A1 | 1/2019 | Gillen |
| 2019/0034863 | A1 | 1/2019 | Winkle et al. |
| 2019/0036932 | A1 | 1/2019 | Bathen et al. |
| 2019/0043001 | A1 | 2/2019 | Woulfe et al. |
| 2019/0102735 | A1 | 4/2019 | Barton et al. |
| 2019/0114714 | A1 | 4/2019 | Jones et al. |
| 2019/0164241 | A1 | 5/2019 | Bässler et al. |
| 2019/0197531 | A1 | 6/2019 | Peenikal et al. |
| 2019/0205898 | A1 | 7/2019 | Greco et al. |
| 2019/0266550 | A1 | 8/2019 | Santosh et al. |
| 2019/0293443 | A1 | 9/2019 | Kelly et al. |
| 2019/0303852 | A1 | 10/2019 | Chopko et al. |
| 2019/0333130 | A1 | 10/2019 | Jha et al. |
| 2020/0005240 | A1 | 1/2020 | Ko et al. |
| 2020/0042933 | A1 | 2/2020 | Jurich, Jr. et al. |
| 2020/0052880 | A1 | 2/2020 | Bathen et al. |
| 2020/0118086 | A1 | 4/2020 | Achkir |
| 2020/0125269 | A1 | 4/2020 | Karame et al. |
| 2020/0142739 | A1 | 5/2020 | Chan et al. |
| 2020/0211000 | A1 | 7/2020 | Narasimhan |
| 2020/0197639 | A1 | 10/2020 | Gray et al. |
| 2020/0311665 | A1 | 10/2020 | Gray et al. |
| 2020/0311666 | A1 | 10/2020 | Gray et al. |
| 2020/0311670 | A1 | 10/2020 | Sankaran et al. |
| 2020/0311675 | A1 | 10/2020 | Sankaran et al. |
| 2020/0311676 | A1 | 10/2020 | Smith, Jr. |
| 2020/0313897 | A1 | 10/2020 | Heath et al. |
| 2021/0272049 | A1 | 9/2021 | Gillen et al. |

(56) References Cited

U.S. PATENT DOCUMENTS

| 2022/0108266 A1 | 4/2022 | Smith et al. |
| 2022/0351125 A1 | 11/2022 | Sankaran et al. |
| 2022/0391831 A1 | 12/2022 | Heath et al. |

FOREIGN PATENT DOCUMENTS

| CN | 107730279 | 2/2018 |
| EP | 3296974 | 3/2018 |
| EP | 3640872 | 4/2020 |
| WO | WO-0180111 | 10/2001 |
| WO | WO-2013002748 | 1/2013 |
| WO | WO-2015021482 | 2/2015 |
| WO | WO-2017127564 | 7/2017 |
| WO | WO-2018099920 | 6/2018 |
| WO | WO-2020096713 | 5/2020 |
| WO | WO-2020197640 | 10/2020 |
| WO | WO-2020197642 | 10/2020 |
| WO | WO-2020197683 | 10/2020 |

OTHER PUBLICATIONS

"CryptoTec AG Blockchain for the Automotive Industry", Retrieved from the Internet URL : <https://test.cryptotec.com//wp-content/uploads/2018/01/Blockchain_for_Automotive_CryptoTec_EN.pdf>, Jan. 1, 2018, 5 Pages.

U.S. Appl. No. 14/471,420, , "Advisory Action received for U.S. Appl. No. 14/471,420, dated May 31, 2018", dated May 31, 2018, 3 Pages.

U.S. Appl. No. 14/471,420, , "Advisory Action received for U.S. Appl. No. 14/471,420 dated Aug. 1, 2022", dated Aug. 1, 2022, 3 Pages.

U.S. Appl. No. 14/471,420, , "Applicant Initiated Interview Summary Received for U.S. Appl. No. 14/471,420, dated Apr. 6, 2020", dated Apr. 6, 2020, 3 Pages.

U.S. Appl. No. 14/471,420, , "Applicant Initiated Interview Summary received for U.S. Appl. No. 14/471,420, dated Nov. 13, 2017", dated Nov. 13, 2017, 3 Pages.

U.S. Appl. No. 14/471,420, , "Final Office Action", U.S. Appl. No. 14/471,420, dated May 20, 2022, 17 pages.

U.S. Appl. No. 14/471,420, , "Final Office Action received for U.S. Appl. No. 14/471,420, dated Aug. 6, 2019", dated Aug. 6, 2019, 15 Pages.

U.S. Appl. No. 14/471,420, , "Final Office Action Received for U.S. Appl. No. 14/471,420, dated Jun. 17, 2020", dated Jun. 17, 2020, 15 Pages.

U.S. Appl. No. 14/471,420, , "Final Office Action Received for U.S. Appl. No. 14/471,420, dated Jun. 18, 2021", dated Jun. 18, 2021, 16 Pages.

U.S. Appl. No. 14/471,420, , "Final Office Action received for U.S. Appl. No. 14/471,420, dated Mar. 15, 2018", dated Mar. 15, 2018, 18 Pages.

U.S. Appl. No. 14/471,420, , "Non Final Office Action Received for U.S. Appl. No. 14/471,420, dated Feb. 7, 2020", dated Feb. 7, 2020, 20 Pages.

U.S. Appl. No. 14/471,420, , "Non Final Office Action Received for U.S. Appl. No. 14/471,420, dated Jan. 7, 2022", dated Jan. 7, 2022, 18 Pages.

U.S. Appl. No. 14/471,420, , "Non-Final Office Action received for U.S. Appl. No. 14/471,420, dated Sep. 11, 2017", dated Sep. 11, 2017, 15 Pages.

U.S. Appl. No. 14/471,420, , "Non-Final Office Action received for U.S. Appl. No. 14/471,420, dated Feb. 26, 2019", dated Feb. 26, 2019, 18 Pages.

U.S. Appl. No. 14/471,420, , "Non-Final Office Action received for U.S. Appl. No. 14/471,420, dated Jan. 28, 2021", dated Jan. 28, 2021, 17 Pages.

U.S. Appl. No. 14/471,420, , "Response to Advisory Action filed on Aug. 15, 2018, for U.S. Appl. No. 14/471,420, dated May 31, 2018", dated Aug. 15, 2018, 13 Pages.

U.S. Appl. No. 14/471,420, , "Response to Final Office Action filed on May 21, 2018, for U.S. Appl. No. 14/471,420, dated Mar. 15, 2018", dated May 21, 2018, 15 Pages.

U.S. Appl. No. 14/471,420, , "Response to Final Office Action filed on Sep. 17, 2020 for U.S. Appl. No. 14/471,420, dated Jun. 17, 2020", Sep. 17, 2020, 13 Pages.

U.S. Appl. No. 14/471,420, , "Response to Final Office Action Filed on Sep. 30, 2019, for U.S. Appl. No. 14/471,420, dated Aug. 6, 2019", dated Sep. 30, 2019, 11 Pages.

U.S. Appl. No. 14/471,420, , "Response to Non-Final Office Action filed on Jan. 11, 2018, for U.S. Appl. No. 14/471,420, dated Sep. 11, 2017", dated Jan. 11, 2018, 14 Pages.

U.S. Appl. No. 14/471,420, , "Response to Non-Final Office Action filed on Jun. 3, 2019 for U.S. Appl. No. 14/471,420, dated Feb. 26, 2019", dated Jun. 3, 2019, 20 Pages.

U.S. Appl. No. 14/471,420, , "Response to Non-Final Office Action filed on May 7, 2020 for U.S. Appl. No. 14/471,420, dated Feb. 7, 2020", dated May 7, 2020, 11 Pages.

U.S. Appl. No. 16/384,362, , "Non-Final Office Action Received for U.S. Appl. No. 16/384,362, dated Nov. 5, 2020", Nov. 5, 2020, 18 Pages.

U.S. Appl. No. 16/454,996, , "Final Office Action", U.S. Appl. No. 16/454,996, dated May 2, 2022, 26 pages.

U.S. Appl. No. 16/454,996, , "Non Final Office Action Received for U.S. Appl. No. 16/454,996, dated Nov. 30, 2021", dated Nov. 30, 2021, 20 Pages.

U.S. Appl. No. 16/454,996, , "Non-Final Office Action", U.S. Appl. No. 16/454,996, dated Jul. 21, 2022, 29 pages.

U.S. Appl. No. 16/455,170, , "Final Office Action", U.S. Appl. No. 16/455,170, dated Jul. 13, 2022, 19 pages.

U.S. Appl. No. 16/455,170, , "Non-Final Office Action", U.S. Appl. No. 16/455,170, dated Sep. 14, 2022, 21 pages.

U.S. Appl. No. 16/455,170, , "Non-final Office Action received for U.S. Appl. No. 16/455,170, dated Feb. 1, 2022", dated Feb. 1, 2022, 19 Pages.

U.S. Appl. No. 16/455,284, , "Final Office Action received for U.S. Appl. No. 16/455,284, dated Sep. 7, 2021", dated Sep. 7, 2021, 20 Pages.

U.S. Appl. No. 16/455,284, , "Non Final Office Action Received for U.S. Appl. No. 16/455,284, dated Mar. 31, 2021", Mar. 31, 2021, 19 Pages.

U.S. Appl. No. 16/455,284, , "Notice of Allowance received for U.S. Appl. No. 16/455,284, dated Feb. 22, 2022", dated Feb. 22, 2022, 12 Pages.

U.S. Appl. No. 16/455,284, , "Supplemental Notice of Allowability", U.S. Appl. No. 16/455,284, dated Jun. 3, 2022, 2 pages.

U.S. Appl. No. 16/455,284, , "Supplemental Notice of Allowability Received for U.S. Appl. No. 16/455,284, dated Mar. 9, 2022", dated Mar. 9, 2022, 2 Pages.

U.S. Appl. No. 16/457,056, , "Final Office Action", U.S. Appl. No. 16/457,056, dated May 10, 2022, 41 pages.

U.S. Appl. No. 16/457,056, , "Final Office Action received for U.S. Appl. No. 16/457,056, dated Sep. 8, 2021", dated Sep. 8, 2021, 30 Pages.

U.S. Appl. No. 16/457,056, , "Non Final Office Action Received for U.S. Appl. No. 16/457,056, dated Apr. 21, 2021", dated Apr. 21, 2021, 28 Pages.

U.S. Appl. No. 16/457,056, , "Non Final Office Action Received for U.S. Appl. No. 16/457,056, dated Dec. 14, 2021", dated Dec. 14, 2021, 34 Pages.

U.S. Appl. No. 16/457,248, , "Corrected Notice of Allowability", U.S. Appl. No. 16/457,248, filed Aug. 24, 2022, 2 pages.

U.S. Appl. No. 16/457,248, , "Corrected Notice of Allowability", U.S. Appl. No. 16/457,248, dated May 25, 2022, 6 pages.

U.S. Appl. No. 16/457,248, , "Non-final Office Action received for U.S. Appl. No. 16/457,248, dated Feb. 3, 2022", dated Feb. 3, 2022, 14 Pages.

U.S. Appl. No. 16/457,248, , "Notice of Allowance", U.S. Appl. No. 16/457,248, dated May 12, 2022, 8 pages.

U.S. Appl. No. 16/458,645, , "Corrected Notice of Allowability", U.S. Appl. No. 16/458,645, dated Sep. 15, 2022, 2 pages.

(56) References Cited

OTHER PUBLICATIONS

U.S. Appl. No. 16/458,645, , "Final Office Action Received for U.S. Appl. No. 16/458,645, dated Sep. 28, 2021", dated Sep. 28, 2021, 35 Pages.
U.S. Appl. No. 16/458,645, , "Non-Final Office Action", U.S. Appl. No. 16/458,645, dated Apr. 15, 2022, 33 pages.
U.S. Appl. No. 16/458,645, , "Non-final Office Action received for U.S. Appl. No. 16/458,645, dated Apr. 5, 2021", dated Apr. 5, 2021, 33 Pages.
U.S. Appl. No. 16/458,645, , "Notice of Allowance received for U.S. Appl. No. 16/458,645, dated Jun. 21, 2022", dated Jun. 21, 2022, 10 pages.
Aitawy, et al., "Lelantos: A Blockchain-based Anonymous Physical Delivery System", 2017 15th Annual Conference on Privacy, Security and Trust, Aug. 2017, 12 Pages.
Boudguiga, et al., "Towards Better Availability and Accountability for IoT Updates by means of a Blockchain", 2017 IEEE European Symposium on Security and Privacy Workshops (EuroS&PW), Apr. 2017, 9 Pages.
Hanhaa, , "Make an Example of Hanhaa's Parcelive—How Else Can it be Used?", Retrieved from the Internet URL : <https://hanhaa.com/make-an-example-of-hanhaas-parcelive-how-else-can-it-be-used/?, Jun. 17, 2019, 5 Pages.
Hasan, et al., "Blockchain-Based Proof of Delivery of Physical Assets With Single and Multiple Transporters", Aug. 21, 2018, IEEE vol. 6, 2018, pp. 46781-46793, Aug. 21, 2018, 13 Pages.
PCT/US2019/053815, , "International Preliminary report received for PCT Patent Application No. PCT/US2019/053815, dated May 20, 2021", dated May 20, 2021, 8 Pages.
PCT/US2019/053815, , "International Search Report received for PCT Application No. PCT/US2019/053815, dated Nov. 22, 2019", dated Nov. 22, 2019, 4 Pages.
PCT/US2019/053815, , "International Written Opinion received for PCT Application No. PCT/US2019/053815, dated Nov. 22, 2019", dated Nov. 22, 2019, 6 Pages.
PCT/US2020/016450, , "International Preliminary Report on Patentability Received for PCT Patent Application No. PCT/US2020/016450, dated Oct. 7, 2021", dated Oct. 7, 2021, 8 Pages.
PCT/US2020/016450, , "International Search Report received for PCT Application No. PCT/US2020/016450, dated Apr. 20, 2020", dated Apr. 20, 2020, 4 Pages.
PCT/US2020/016450, , "Written Opinion received for PCT Patent Application No. PCT/US2020/016450, dated Apr. 20, 2020", dated Apr. 20, 2020, 6 Pages.
PCT/US2020/016453, , "International Preliminary Report on Patentability received for PCT Application No. PCT/US2020/016453, dated Oct. 7, 2021", dated Oct. 7, 2021, 9 Pages.
PCT/US2020/016453, , "International Search Report received for PCT Application No. PCT/US2020/016453, dated Apr. 21, 2020", dated Apr. 21, 2020, 3 Pages.
PCT/US2020/016453, , "Written Opinion received for PCT Patent Application No. PCT/US2020/016453, dated Apr. 21, 2020", dated Apr. 21, 2020, 7 Pages.
PCT/US2020/016680, , "International Preliminary Report on Patentability Received for PCT Patent Application No. PCT/US2020/016680, dated Oct. 7, 2021", dated Oct. 7, 2021, 8 Pages.
PCT/US2020/016680, , "International Search Report received for PCT Application No. PCT/US2020/016680, dated Apr. 24, 2020", dated Apr. 24, 2020, 4 Pages.
PCT/US2020/016680, , "Written Opinion received for PCT Patent Application No. PCT/US2020/016680, dated Apr. 24, 2020", dated Apr. 24, 2020, 6 Pages.
PCT/US2020/019976, , "International Preliminary Report on Patentability received for PCT Application No. PCT/US2020/019976, dated Oct. 7, 2021", dated Oct. 7, 2021, 7 Pages.
PCT/US2020/019976, , "International Search Report received for PCT Application No. PCT/US2020/019976, dated Apr. 23, 2020", dated Apr. 23, 2020, 3 Pages.
PCT/US2020/019976, , "International Written Opinion received for PCT Patent Application No. PCT/US2020/019976 , dated Apr. 23, 2020", dated Apr. 23, 2020, 5 Pages.
Wikipedia, , "Spinning pinwheel", Retrieved from Internet URL: https://en.wikipedia.org/wiki/Spinning_pinwheel, Accessed on Dec. 21, 2021, 4 Pages.
Wikipedia, , "Windows wait cursor", Retrieved from Internet URL: https://en.wikipedia.org/wiki/Windows_wait_cursor, Accessed on Dec. 21, 2021, 1 Page.
Zhang, et al., "FHIRChain: Applying Blockchain to Securely and Scalably Share Clinical Data", Retrieved from the internet: <https://www.sciencedirect.com/science/article/pii/S2001037018300370>, Jul. 29, 2018, 12 Pages.
U.S. Appl. No. 16/454,996 , "Final Office Action", U.S. Appl. No. 16/454,996, dated Dec. 5, 2022, 31 pages.
U.S. Appl. No. 16/455,170 , "Final Office Action", U.S. Appl. No. 16/455,170, dated Jan. 9, 2023, 22 pages.
202080022859.6 , "Foreign Office Action", ON Application No. 202080022859.6, dated Nov. 4, 2022, 19 pages.
202080024681.9 , "Foreign Office Action", CN Application No. 202080024681.9, dated Nov. 2, 2022, 17 pages.
U.S. Appl. No. 16/454,996, "Non-Final Office Action", U.S. Appl. No. 16/454,996, dated Mar. 1, 2023, 28 pages.
202080022859.6, "Office Action", CN Application No. 202080022859.6, dated Mar. 8, 2023, 10 pages.

\* cited by examiner

```
SHIPPING INFORMATION DATA BLOCK          242

ITEM_ID
RECIPIENT_info(ID, ADDRESS_data, CONTACT)
NEXT_addr(SHIPPER_ID, location)
LOCATION_data

METHODS

Get_next_addr(ITEM_ID, SHIPPER_ID, LOCATION_data, /*
Called by shipper with location to obtain next address */
{
        Store(LOCATION_data) /* Store the current location,
delivery status */
        NEXT_addr=Determine(RECIPIENT_info.ADDR_data,
LOCATION_data) /* Get next address for item */
        return(NEXT_addr)
}

Determine(ADDR_data, LOCATION_data) /* Called to determine
next shipper and address for item */
{
        if
                distance(ADDR_data, LOCATION_data)<
                        VICINITY_threshold
                    NEXT_addr = notify(CONTACT)
        else
                identify(NEXT_addr.shipper_id,
                    Next_addr.location_id)
                return(NEXT_addr)
}

Notify(CONTACT) /* Notify contact that item is in vicinity */
{
        if CONTACT.change_addr == TRUE /* Recipient requests
new address */
                return(CONTACT.new_addr)
        else
                return(ADDRESS_data)
}
```

```
SHIPPING INFO DATA BLOCK

ITEM_ID(ItemID_1)
    SENDER(sender-public-key, geo-addr-sender)
    RECIPIENT_info
        (RecID_1, recipient-public-key, geo-addr-recipient
    SHIPPER-A: geo-addr-a, public-key-A
    SHIPPER-B: geo-addr-b, public-key-B
    SHIPPER-C: geo-addr-c, public-key-C METHOD(s)
P2SH
SENDER_signature
```

SECURE SHIPPING INTERACTIONS USING BLOCKCHAINS

CROSS REFERENCE TO RELATED APPLICATIONS

This application claims the benefit of U.S. patent application Ser. No. 16/458,645 for "Secure Shipping Interactions Using Blockchains" filed Jul. 1, 2019, which claims priority to U.S. Provisional Patent Appl. No. 62/825,710 for "Enhanced Data Management for Shipping and Inventory Systems" filed Mar. 28, 2019, herein incorporated by reference in its entirety for all purposes.

BACKGROUND

At present, shipping labels for packages and documents typically include a shipping destination and other information to enable delivery. As a consequence, these shipping labels often expose a lot of private information, e.g. shipper's name and address, recipient's address and name, in plain text that can be read by anyone with access to the package. This information can be used for nefarious purposes such as identity theft or profiling.

Some shipping labels utilize barcodes that can be scanned to read a tracking number associated with the shipment. These barcodes are machine readable, but often can be used to obtain private information. For example, many shipping agents in the shipping chain with a code reader can obtain the recipient's name and address information.

It is with respect to these and other considerations that the disclosure made herein is presented.

SUMMARY

Technologies are disclosed for securing private information during shipping of an item.

Examples of the disclosed technology concern methods, systems and media for securing private information during shipping of an item that involve storing shipping information for an item on a blockchain at a blockchain address, the shipping information including a recipient geolocation address and generating a shipping label that includes a machine-readable pointer to the blockchain address. The disclosed technology can also involve receiving a first request for the shipping information from a first shipping agent that includes the blockchain address and providing the recipient geolocation address to the first shipping agent responsive to the first request for shipping information.

In certain examples, the step of storing shipping information for an item on a blockchain includes storing a first authorization key. The operation of receiving a first request for shipping information from a first shipping agent involves receiving a first request for shipping information from a first shipping agent with the first authorization key. These examples include authenticating the first shipping agent using the first authentication key. The operation of providing the recipient geolocation address to the first shipping agent responsive to the first request for shipping information involves providing the recipient geolocation address to the first shipping agent responsive to the first request for shipping information if authentication of the first shipping agent is successful. In further examples, authenticating the first shipping agent using the first authentication key involves decrypting the first request for the recipient geolocation address using the first authentication key.

In some examples, the operation of storing shipping information for an item in a blockchain includes storing at least one intermediate geolocation address for an intermediate stage of a shipping chain to the recipient geolocation address. These examples include receiving a second request for the shipping information from a second shipping agent and providing the intermediate geolocation address to the second shipping agent responsive to the second request for the shipping information.

In particular examples, the operation of storing shipping information for an item in a blockchain includes storing a second authentication key. The operation of receiving a second request for the shipping information from a second shipping agent involves receiving a second request for the shipping information from a second shipping agent with the second authentication key. These examples include authenticating the second shipping agent using the second authentication key. The operation of sending the intermediate geolocation address to the second shipping agent responsive to the second request for the shipping information involves providing the intermediate geolocation address to the second shipping agent if authentication of the second shipping agent is successful.

Still other examples involve sending a notification to a recipient corresponding to the recipient geolocation address responsive to the first request for the shipping information and receiving an authorization from the recipient responsive to the notification. In these examples, the operation of providing the recipient geolocation address to the first shipping agent responsive to the first request for shipping information involves providing the recipient geolocation address to the first shipping agent responsive to the first request for shipping information if the authorization from the recipient is received.

In yet other examples, the authorization from the recipient includes a recipient defined alternate geolocation address. The operation of providing the recipient geolocation address to the first shipping agent responsive to the first request for shipping information involves providing the recipient defined alternate geolocation address to the first shipping agent responsive to the first request for shipping information.

Other examples of the disclosed technology concern methods, systems and media for securing private information during shipping of an item that involve creating a contract on a blockchain with shipping information for an item, the shipping information including encrypted personal information for a recipient that includes a recipient geolocation address, generating a shipping label that includes a blockchain address for accessing the contract, receiving a first request for the shipping information from a first shipping agent that includes the blockchain address and providing the recipient geolocation address to the first shipping agent responsive to the first request for shipping information.

In some particular examples, the shipping information for the item includes a first encryption key associated with the first shipping agent and the recipient geolocation address is encrypted using the first encryption key and the operation of providing the recipient geolocation address to the first shipping agent responsive to the first request for shipping information involves providing the encrypted recipient geolocation address to the first shipping agent responsive to the first request for shipping information.

In some of these examples, the shipping information for the item includes an identifier for a second shipping agent and the technology includes receiving a second request for the shipping information and providing the identifier for the second shipping agent responsive to the second request for the shipping information.

Particular ones of these examples involve receiving a second request for the shipping information that includes a geolocation for the item, determining a second shipping agent based on the geolocation for the item, and providing either an identifier or a geolocation address for the second shipping agent responsive to the second request for the shipping information.

In certain other examples, the first request includes a geolocation for the item and the operation of providing the recipient geolocation address to the first shipping agent responsive to the first request for shipping information involves determining a distance of the geolocation for the item to the recipient geolocation address, notifying the recipient if the distance of the geolocation for the item to the recipient geolocation address is within a vicinity threshold, receiving an authorization to provide the recipient geolocation address, and providing the recipient geolocation address to the first shipping agent responsive to the first request for shipping information if the authorization is received.

In yet another example, the authorization from the recipient includes a recipient defined alternate geolocation address and the operation of providing the recipient geolocation address to the first shipping agent responsive to the first request for shipping information involves providing the recipient defined alternate geolocation address to the first shipping agent responsive to the first request for shipping information.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2B is a data architecture diagram showing an illustrative example of a shipping information data block that includes executable methods;

FIG. 2D is a data architecture diagram showing an illustrative example of shipping information for an item secured in a shipping information data block;

DETAILED DESCRIPTION

Figure 1:
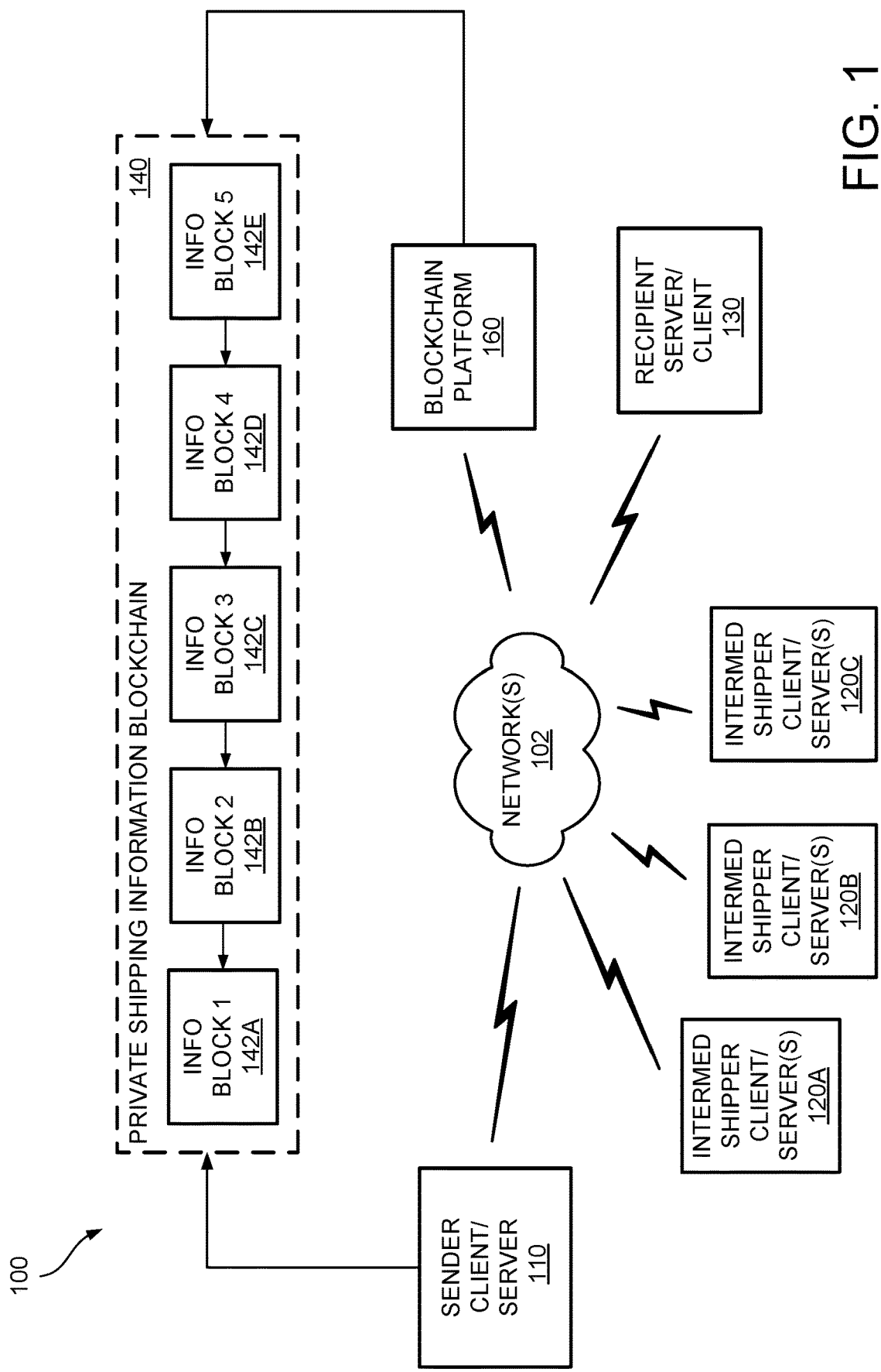
FIG. 1 is an architectural diagram showing an illustrative example of a system for securing private information during shipping of an item using shipping information blockchain to store shipping information data.

In the context of security and privacy, it can be advantageous to avoid unnecessarily exposing personal information, such as a name or full address of a recipient of a package. Typically, shipping labels for packages and documents, e.g. bills of lading, often include sensitive personal information, such as a recipient's name, the recipient's home or work geolocation, e.g. address, and other information to enable delivery. As a consequence, these shipping labels can expose sensitive private information, e.g. shipper's name and address, recipient's name and address, in plain text that can be read by anyone with access to the package. This information can be used for nefarious purposes such as identity theft or profiling or to identify items of value for theft.

Some shipping labels utilize barcodes that can be scanned to read a tracking number associated with the shipment. These barcodes are machine readable, but can often be used to obtain private information. For example, many shipping agents in the shipping chain with a code reader can obtain the recipient's name and address information.

In addition, it can be advantageous to store the shipping information, such as recipient information, in a manner that is secure, e.g. encrypted, to prevent unauthorized access or modification, but can be widely distributed and reliably accessed by authorized entities.

In general terms, in an example of certain aspects of the disclosed technology, a shipping label for delivery of an item or package can be utilized that does not include a recipient's full personal address information, e.g. name, street address, geographical location, etc. For example, a shipping label can include no geolocation address, a partial address, or an approximate address along with a machine-readable pointer (e.g., QR code) to a blockchain address that securely stores the full shipping information needed to deliver the item to the recipient.

The secure, distributed and immutable nature of the blockchain allows a shipping agent involved in the shipping process to access an accurate record of the shipping information. Shipping agents can use a smartphone or other device connected to the Internet to scan the QR code and access the shipping information from the blockchain. Access to the shipping information can be controlled such that only an authorized agent can obtain access to part or all of the shipping information.

In one example, partial or approximate recipient address information is printed on the label, such as a zip code that enables shipping agents to see an approximate, partial, or intermediate location in order to transship the package. Access to the full recipient address, in this example, is limited. For example, the full recipient address can be made available only to an authorized agent located in a defined proximity to the partial recipient address information, e.g. same zip code.

In additional examples, access to the full recipient address, e.g. recipient's name and address, can be made available only upon satisfaction of specified conditions, such as permission being granted by the recipient or authentication of the last-mile delivery agent. For example, the specified condition can require that the geolocation of the shipper's scanning device or the package is close to the delivery destination before the delivery address can be revealed to the last-mile delivery agent. In yet another example, the recipient can be notified when the package is in a selected proximity to the final destination and the recipient provides authorization to reveal the final destination address or provides an alternative destination address.

In another example, no recipient address or partial address information is printed on the label and the machine-readable pointer must be scanned to obtain shipping information. At each intermediate stage of shipping, e.g. pickup, transshipment, or delivery, an agent scans the machine-readable pointer from the shipping label to obtain a destination address for the next stage of shipment from the blockchain.

Note that for shipping that uses multiple delivery agents, certain examples of the disclosed technology can operate such that each agent is shown only the address of the hand-off or delivery location to the next agent. For example, a pickup agent scans the machine-readable pointer on a package and receives an identifier or address for a bulk shipper to which the package is brought. A bulk shipper transfer agent scans the machine-readable pointer on the package and receives an identifier or address for a destination city and bulk ships the package to the destination city. At the destination city, another bulk shipper transfer agent scans the machine-readable pointer on the package and receives an identifier or address for a local delivery service to which the package is transferred. An agent for the local delivery service scans the machine-readable pointer on the package to obtain a final delivery address, e.g. recipient address, for the package from the blockchain.

In another example, authentication of a delivery agent can be required in order to obtain the destination. If the delivery agent is not authorized, then an alternative address, such as a nearest authorized agent, can be shown. Multiple alternative addresses can be stored in the blockchain based on various conditions, e.g. an alternative address is provided if last-mile delivery agent indicates inability to deliver to the primary address.

In still another example of particular aspects of the disclosed technology, the destination address can be changed during shipping and stored in the blockchain in association with the machine-readable pointer printed on the package label. For example, the recipient for the package can modify the destination address on the blockchain. In another example, an alternative intermediate shipper can be substituted for an intermediate shipper in the shipping chain.

It will be readily appreciated that the disclosed technology is versatile and flexible and can include additional features. For example, the information stored on the blockchain can include a sender's address and contact information as well as contact information for one or more shippers in the shipping chain. In additional examples, selective release of data such as complete delivery address may be regulated by smart contracts in the blockchain. In another example, a last-mile driver's public key is known and used to encode a complete recipient delivery address at the start of shipping (e.g. a preferred shipping agent of the recipient can be specified).

Still another example provides for a return address to be stored on the blockchain and revealed if a return is authorized. In yet another example, a recipient mailbox has a scanner and a private key where the machine-readable pointer on the shipping label is scanned and the private key used to enable the mailbox to be opened.

Securing private information during shipping of an item using shipping information blockchain in accordance with the disclosed technology can operate to significantly improve the security and privacy of shipping information data.

One technical advantage of certain aspects of securing private information during shipping of an item of the disclosed technology is that the privacy of shipping information can be maintained and selectively released. Since certain aspects of the disclosed technology provide for a recipient to be notified and allow the recipient to provide an alternative geolocation address for delivery, service and security can be improved because the recipient can be notified of a pending arrival of an item and can redirect delivery.

Another technical advantage to certain aspects of the disclosed technology is that the shipping information data can be stored on a blockchain and secured by the multi-signature cryptographic and consensus security approaches utilized by the blockchain. Storing shipping information data on a blockchain permits the shipping information data to be widely distributed and accessible to intermediate shippers and the recipient, and yet maintain security and integrity of the data used by machines.

In general, the disclosed technology for securing private information during shipping of an item using shipping information blockchain can limit or control disclosure of private information during shipping of an item. Aspects of the disclosed technology provide for shipping information to be encrypted and selectively released to shippers during shipping and the shipping information released can be limited to information needed for a next leg of a shipping chain. Other aspects of the disclosed technology provide for a recipient to be notified that an item is arriving or in a nearby vicinity to the recipient and the recipient can provide an alternative geo location address for delivery of the item.

The following Detailed Description describes technologies for securing private information during shipping of an item using shipping information blockchain. The shipping information can be maintained on a blockchain for security, accessibility and immutability.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for securing private information during shipping of an item will be described. As will be described in more detail below with respect to the figures, there are several applications and services that can embody the functionality and techniques described herein.

FIG. 1 is an architectural diagram showing an illustrative example of a system architecture 100 wherein a blockchain platform 160 maintains shipping information data blockchain 140 that stores shipping information and can be accessed via a wide area network 102. In this example, sender client/server 110 stores encrypted shipping information in shipping information data blocks 142A-E of shipping information blockchain 140. When a new item is shipped, a new shipping information data block 142 can be created and linked to blockchain 140 to store the shipping information for the new item.

In addition or alternatively, blockchain 140 can be used to store shipping status information and a new shipping information data block 142 can be created and linked to blockchain 140 when a shipper reports a geolocation or status change for an item during shipping. In another addition or alternative, modifications to the shipping information can be made during transit and stored in new shipping information data blocks 142 added to the blockchain.

In the embodiment of FIG. 1, blockchain 140 can be a publicly available blockchain that supports scripting, such as the ETHEREUM blockchain, which supports a SOLIDITY scripting language, or BITCOIN, which supports a scripting language called SCRIPT. Blockchain 140 can also each be a private blockchain, or a combination of public and private blockchains can be utilized.

In this example, sender client/server 110 is a seller or sender entity that controls the shipping information blockchain 140, where the sender entity owns the blockchain 140 or the shipping information data blocks 142. The sender can add items and shipping information or modify shipping information by adding shipping information data blocks 142 to blockchain 140 that add, delete or modify shipping information. In this example, the shipping information data blocks 142 each require the cryptographic signature of the sender entity to be valid. Also note that the shipping information in blocks 142 can be encrypted to limit access to only authorized entities or to restrict access to only a portion of the shipping information.

In the example of FIG. 1, sender client/server 110 initiates shipping information blockchain 140 by creating genesis block 142A when an item is selected for shipment. In other examples, the shipping information data blocks 142 can be added to an existing blockchain when items are shipped or shipping information modified. A shipping information data block 142 can include methods or function calls that are executed by blockchain platform 160 to obtain access to the shipping information stored for an item or package on blockchain 140.

In the example of FIG. 1, a shipping information data block 142 is generated by sender client/server 110 and the block is secured on shipping information data blockchain 140. The shipping information stored in shipping information data blocks 142 can relate to an item or package that is to be handled by multiple intermediate shipping entities, such as intermediate shipper client/servers 120A, 120B or 120C, through which services, operations or access to shipping information can be requested. In this example, the intermediate shipper client/servers 120 can communicate with Sender client/server 110 as well as a network of servers for blockchain platform 160 that supports and maintains blockchain 140. For example, the ETHEREUM blockchain platform from the ETHEREUM FOUNDATION of Switzerland provides a decentralized, distributed computing platform and operating system that provides scripting functionality.

In one example, sender client/server 110 owns and controls the shipping information data blocks 142 in shipping information data blockchain 140. Each shipping information data block 142 includes shipping information, such as sender name and address or recipient name and address, for an item or package selected for shipment. When an item is selected for shipment, the Sender client/server 110 creates a shipping information data block 142 containing the shipping information and links it to shipping information blockchain 140. All or part of the shipping information can be encrypted to prevent unauthorized access. When shipping information is added, modified or deleted, a new shipping information data block 142 is created that incorporates the changes and the new block 142 is signed by sender client/server 110 and linked to the previous shipping information data block in the shipping information blockchain 140.

Although sender client/server 110 maintains control over the shipping information, in this example, the shipping information blockchain 140 can be made accessible to other entities, such as intermediate shipper client/servers 120, so that these entities can obtain, trace or audit the relevant shipping information stored in the blocks 142 in the blockchain 140.

In some examples, the shipping information blockchain 140 may be viewable to other entities through the use of applications that can access blockchain information. By providing access to the shipping information blockchain 140, this approach allows users, such as intermediate shipper client/servers 120, to readily access shipping information maintained on the shipping information blockchain 140 under the control of the sender client/server 110.

In another example, aspects of the shipping information blockchain 140 may be restricted to being viewable only to entities that are authorized to access the blockchain 140, such as sender client/server 110 or recipient server/client 130. In certain examples, intermediate shipper client/servers 120 receive access to limited shipping information, such as the geolocation and identity of the next intermediate shipper in the shipping chain, or require authentication in order to receive shipping information.

Figure 2A:
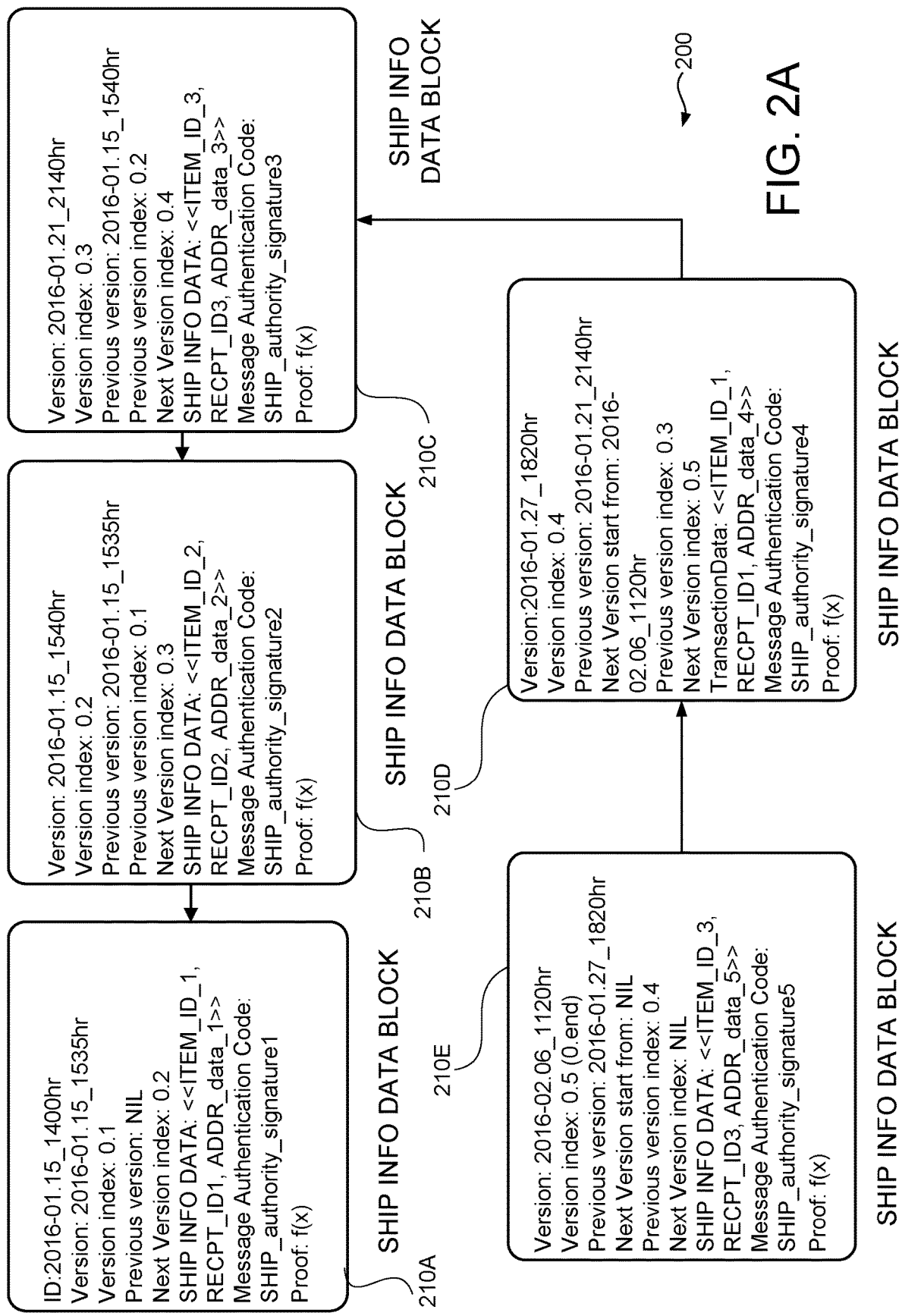
FIG. 2A is a data architecture diagram showing an illustrative example of shipping information blockchain with shipping information data blocks that secure shipping data for items.

FIG. 2A is a data architecture diagram illustrating a simplified example of shipping information blockchain ledger 200 based on the blocks 142A-E of the shipping information blockchain ledger 140 of FIG. 1. The shipping information blockchain ledger 200 example of FIG. 2 is simplified to show block headers, simplified shipping information, and signatures of blocks 210A-E in order to demonstrate storage of shipping information using a blockchain. In outline, a blockchain ledger may be a globally shared transactional database. Signatures can, in some examples, involve all or part of the data stored in the data the blocks 142A-E and can also involve public key addresses corresponding to the sender entity, the recipient entity, or the intermediate shipping entities.

The blockchain ledger 200 may be arranged as a Merkle tree data structure, as a linked list, or as any similar data structure that allows for cryptographic integrity. The blockchain ledger 200 allows for verification that the shipping information has not been corrupted or tampered with because any attempt to tamper will change a Message Authentication Code (or hash) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of shipping information blockchain 200 in the example of FIG. 2 shows securing shipping information with a series of shipping information data blocks on the blockchain. In this example, sender client/server 110 of FIG. 1 stores shipping information ADDR_data_1 for a first shipping item identified by ITEM_ID_1, e.g. an item serial number, in shipping information data block 210A. Sender client/server 110 signs the shipping information data block 210A and the blockchain system within which blockchain 200 is created verifies the shipping information data block based on a proof function.

Note that shipping information data blocks 210B-E for successive additions, modifications or deletions to shipping information can be created and linked to shipping information data block 210A such that a history of the shipping information is immutably and traceably stored using blockchain 200. Also note that the shipping information in the blocks can be encrypted to control access to the information.

Also note that a variety of approaches may be utilized that remain consistent with the disclosed technology. In some examples relating to shipping information, a trusted entity other than the user of sender client/server 110, such as a seller of an item who defines shipping information, can create, verify or validate shipping information data blocks 210A-E. In other examples, multiple entities can be involved in verifying shipping information data blocks, such as by requiring signatures from sender client/server 110 and a seller who defines shipping information, to verify or validate shipping information data blocks 210A-E.

In the example of FIG. 2A, shipping information data blocks 210 of shipping information data blockchain 200 include certificate identifiers and shipping information along with a signature of sender client/server 110. To add another shipping information data block for the same or a different shipping item, sender client/server 110 creates shipping information data block 210B, which identifies the shipping item ITEM_ID_2 and includes the shipping information ADDR_data_2. Sender client/server 110 signs shipping information data block 210B and commits block 210B to blockchain 200 for verification by the blockchain platform. To add a shipping information data block for an additional shipping item, sender client/server 110 creates shipping information data block 210C to secure shipping information ADDR_data_3 for shipping item ITEM_ID_3.

Similarly, to modify shipping information for an item, a shipping information data block can be created to store the modified shipping information. In the example of FIG. 2, sender client/server 110 creates shipping information data block 210D to store modified shipping information ADDR_data_4 for shipping item ITEM_ID_1. Likewise, to modify the shipping information for shipping item ITEM_ID_3, sender client/server 110 creates shipping information data block 210E to store modified shipping information ADDR_data_5.

FIG. 2B is a data architecture diagram showing an illustrative example of a shipping information data block that includes methods that can be executed by a blockchain platform that supports the data block, such as blockchain platform 160. In this example, shipping information data block 142 includes an ITEM_ID field for an item identifier value, a RECIPIENT_info record for a recipient identifier, a recipient geolocation address ADDRESS_data, and contact information, e.g. phone or email.

One or more NEXT_addr records store a shipper identifier SHIPPER_ID along with a geolocation for the shipper. This example also includes an optional LOCATION_data field for storing a record of a geolocation of the item during shipping when a shipping block is created.

As noted above, shipping information data block 242 can include methods that can be executed by a blockchain platform. In this example, a Get_next_addr( ) method can be called by a shipper with a location of the item to obtain the next shipping address in the shipping chain. In this example, the location of the item is stored as LOCATION_data and may include current shipping status. The Next_addr value is obtained by calling another method Determine( ) with block 242. The Next_addr value obtained from the Determine( ) function is returned to the requestor, e.g. an intermediate shipper.

The Determine( ) function is called to determine the next address for shipment of the item. In this example, the LOCATION_data is used to determine whether the geolocation of the item is within a vicinity threshold of the recipient's geolocation address. A distance( ) function is called to determine the distance between the item and the recipient's address.

If the distance is within the vicinity threshold, then a notify( ) function is invoked to send a message to the recipient notifying them of the shipping status of the item and obtain the next address NEXT_addr for shipping of the item. The notify( ) function can provide the recipient with a capability to send an alternative geolocation for delivery of the item. For example, a recipient can be charged a special delivery fee to have the item delivered to the alternative geolocation. In another example, the notify( ) function can be utilized to obtain the recipient's authorization to release their geolocation or other private data to the shipper.

Figure 2C:
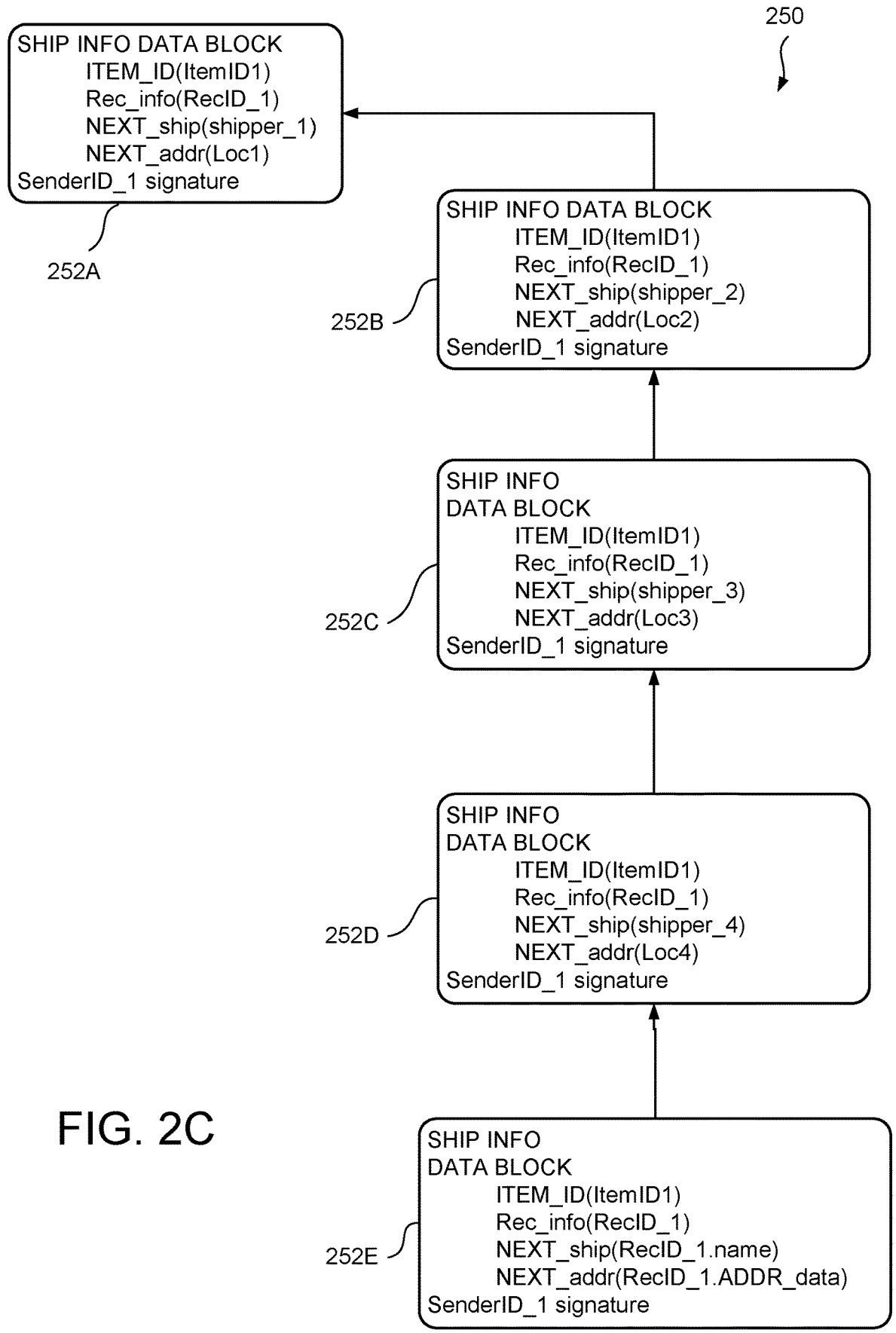
FIG. 2C is a data architecture diagram showing an illustrative example of shipping information blockchain with shipping data for an item secured in multiple shipping information data blocks.

If the item is not within the vicinity threshold, then, in this example, the shipper and the next address for the next leg of the shipping chain for the item is returned as the NEXT_addr for the item. For example, the shipper identifier and geolocation address can be obtained from the next shipping information data block in the blockchain 140, as illustrated in the example of FIG. 2C. In a different example, the shipper identifier and geolocation address can be obtained from the next shipper record stored in the shipping information data block, as illustrated in the example of FIG. 2D. In yet another example, a shipper can be selected based on proximity to the present location of the item. A wide variety of approaches to selecting the next shipper and address can be enabled by the disclosed technology.

FIG. 2C is a data architecture diagram showing an illustrative example of shipping information blockchain with shipping data for an item secured in multiple shipping information data blocks 252 in shipping information blockchain 250. In this example, each leg of the shipping chain is defined in a separate shipping information data block 252.

Shipping information data block 252A identifies the next shipper NEXT_ship as shipper_1 and the next geolocation for shipping NEXT_addr as Loc1. Sender client/server 110 could scan a shipping label on the item and obtain shipper_1 and Loc1 from block 252A. When the item arrives at shipper_1, an intermediate shipper using client/server device 120 can scan the label and request the next shipper information, which is shipper_2 and Loc2 from block 252B.

Similarly, each time the item arrives at the next address, the shipper can scan the label and request the next shipper information. Thus, in this example, the item is successively shipped from shipper_2 at Loc2 defined in block 252B to shipper_3 at Loc3 defined in block 252C to shipper_4 at Loc4 defined in block 252D.

Shipping information data block 252E indicates the endpoint of the shipping chain. As such, the Next_ship is defined as the recipient's name and the Next_addr is defined as the recipient's address. Thus, the item will be shipped to the recipient at the recipient's geolocation address. As noted above, many variations in delivery schemes are possible with the disclosed technology, such as the recipient providing an alternative geolocation address for delivery.

FIG. 2D is a data architecture diagram showing an illustrative example of shipping information for an item secured in a shipping information data block 262A on a shipping information blockchain 260. In this example, information for each leg of the shipping chain is defined in block 262A along with a public key for the sender, the recipient and each intermediate shipper for use in authentication.

In this example, methods are provided in block 262A for accessing the shipping information. For example, each time an intermediate shipper sends an encrypted request for the next shipper and address information, the request is decrypted on the blockchain platform using the intermediate shipper's public key. If the request is authenticated utilizing keys, then the next address information is sent to the requesting shipper.

In the example of FIG. 2D, when the sender entity requests the next shipper and address, it receives SHIPPER-A and geo-addr-a. When SHIPPER-A requests the next shipper and address, it receives SHIPPER-B and geo-addr-b. When SHIPPER-B requests the next shipper and address, it receives SHIPPER-C and geo-addr-c. When SHIPPER-C requests the next shipper and address, the methods recognize the end of the shipping chain and SHIPPER-C receives the recipient's delivery information, e.g. RecID_1 and geo-addr-recipient.

It will be readily recognized that the examples provided in FIGS. 2A-D are simplified and non-exclusive. A wide variety of different approaches of varying complexity can be implemented utilizing aspects of the disclosed technology.

Figure 3A:
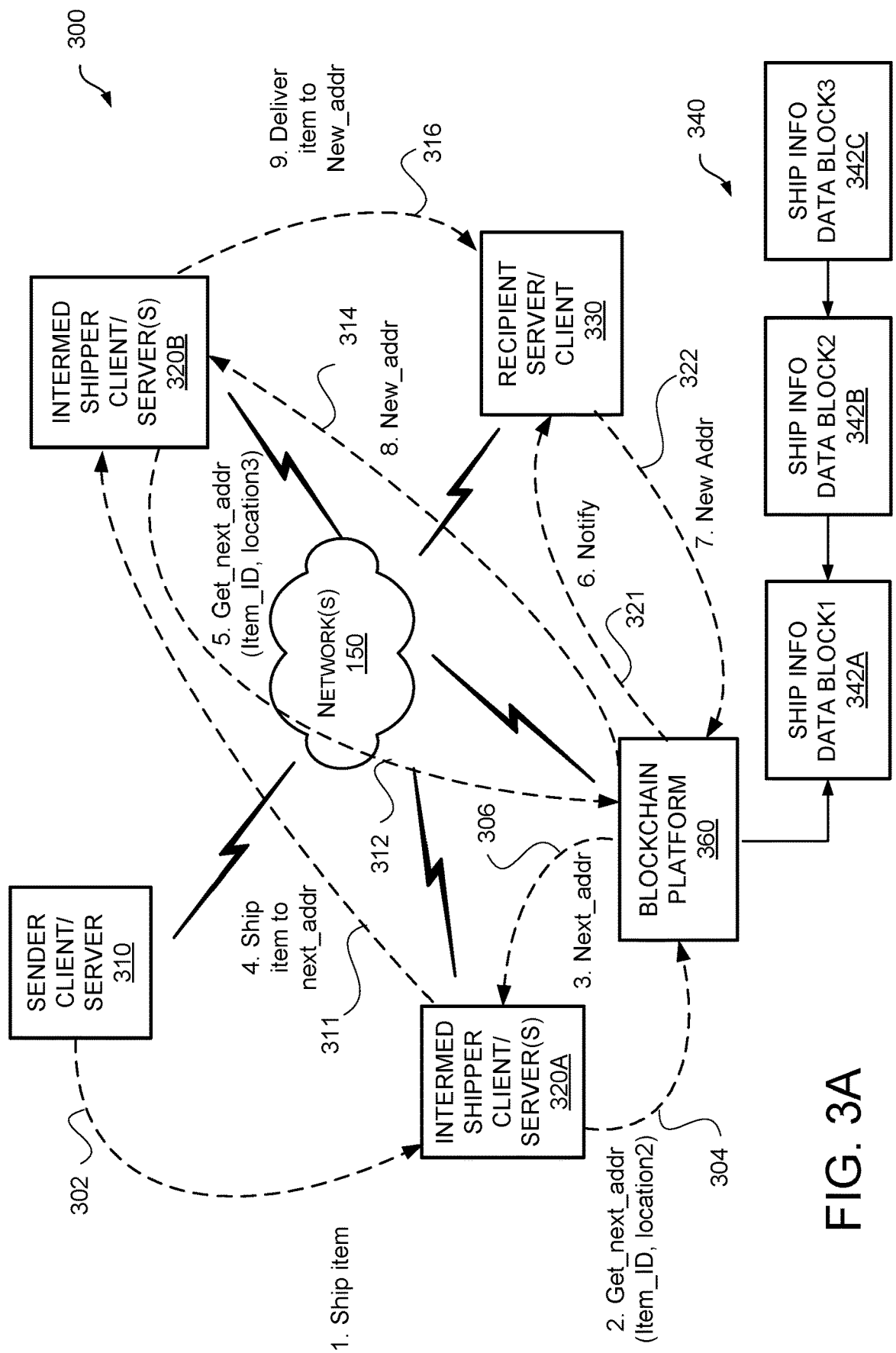
FIG. 3A is a functional block diagram showing an illustrative example of an architecture and data flow for securing private information during shipping of an item using shipping information blockchain to store shipping information data.

FIG. 3A is a functional block diagram showing an illustrative example of an architecture and data flow 300 for securing private information during shipping of an item using shipping information blockchain to store shipping information data in the context of the example of FIGS. 2B and 2C. In this example, sender entity using sender client/server 310 has defined a shipping chain for shipping an item and stored the shipping chain for the item in shipping information blockchain 140. At 302, the sender entity using sender client/server 310 ships the item to a first intermediate shipper entity utilizing client server 320A.

When the item arrives at the first intermediate shipper, the item is scanned by client/server 320A to obtain an item identifier value and a blockchain address for the shipped item. At 304, Get_next_addr(Item_ID, location2) is invoked in shipping information data block 342A to obtain the next shipping address from blockchain 340. At 306, client/server 320A receives the Next_addr information from blockchain platform 160 and utilizes the next address to ship the item, at 311, to the second intermediate shipper associated with client/server 320B.

When the item arrives at the second intermediate shipper, the item is scanned by client/server 320B to obtain an item identifier value and a blockchain address for the shipped item. At 312, Get_next_addr(Item_ID, location3) is invoked in shipping information data block 342A to obtain the next shipping address from blockchain 340, which, in this example, is the recipient's address.

In this example, the Notify( ) function is invoked to send an arrival notification message, at 321, to recipient client/server 330. Recipient client/server 330 responds to the arrival notification, at 322, with a new geolocation address for delivery, e.g. a work address. At 314, the new delivery address is provided to client/server 320B. At 316, the second intermediate shipper utilizes the new address sent at 314 to deliver the item to the recipient at the new geolocation address provided at 322.

Note that the Next_addr information can be limited to the next leg of the shipping chain until final delivery to the recipient. In this way, private information can remain secure through most of the shipping process. In addition, the requests to Get_next_addr can include authentication, such as using public-private key pairs to confirm identity of a requestor.

As noted above, the shipping information can be stored in a blockchain and backed by the multisignature cryptographic signature methods currently used by blockchain frameworks to ensure that shipping information is secure and trackable to its origins. Modifications of shipping information can be stored in the blockchain by creating and linking additional shipping information data blocks. When shipping information is obtained from the blockchain, only the latest shipping information is used in the authentication utilizing service permissions bound to an item or package of the disclosed technology.

A technical advantage of the example of FIG. 3A is that the shipping information for an item can be modified by adding shipping information data blocks to the shipping information blockchain. The blockchain address from the shipping label can remain unchanged. Therefore, the shipping label does not need to be replaced or reissued to modify the shipping information.

Figure 3B:
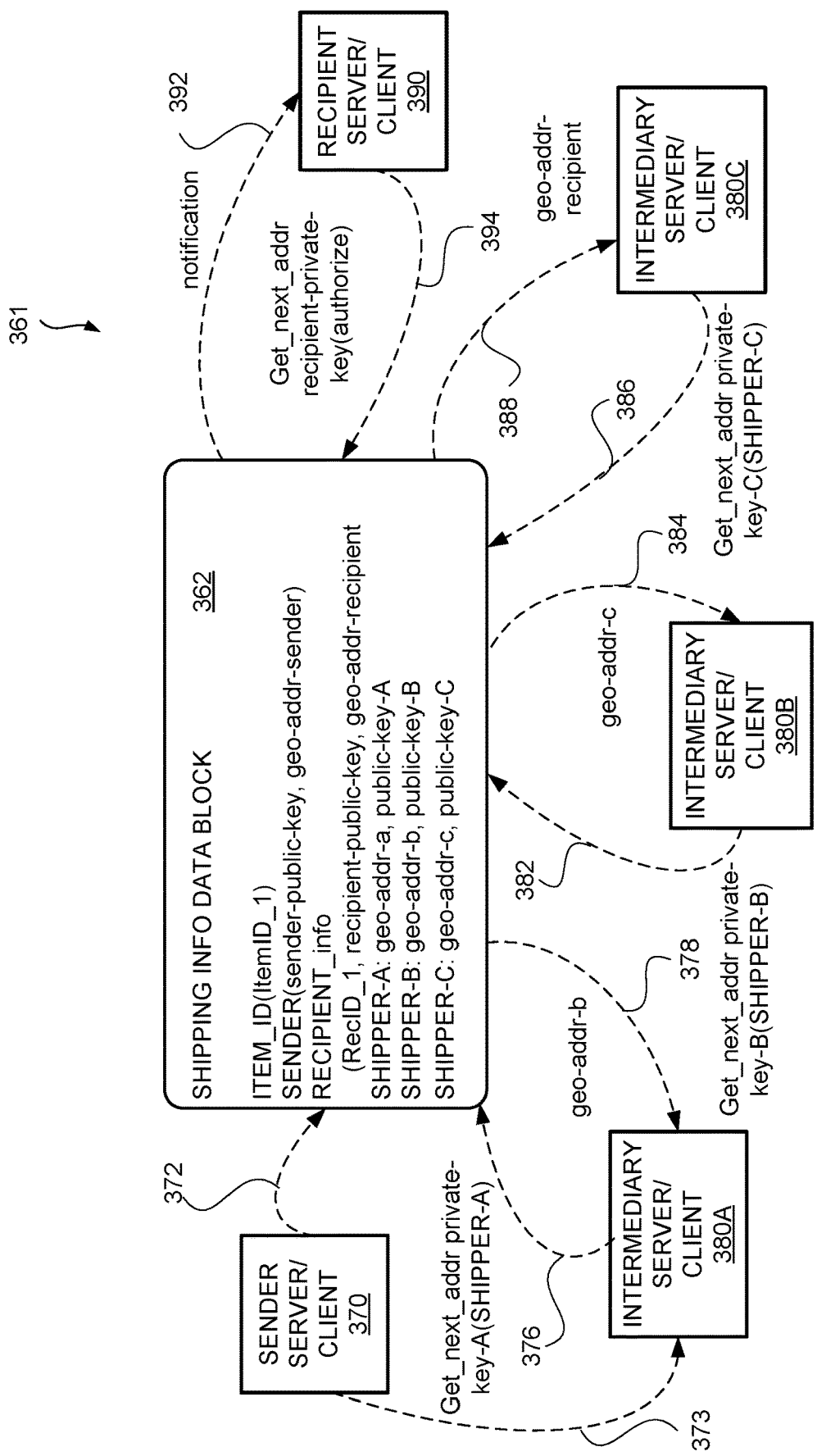
FIG. 3B is a functional diagram showing another illustrative example of an architecture and data flow for securing private information during shipping of an item using shipping information blockchain to store shipping information data.

FIG. 3B is a functional diagram showing another illustrative example of an architecture and data flow 361 for securing private information during shipping of an item using a shipping information blockchain to store shipping information data in the context of the example of FIG. 2D.

At 372, sender server/client 370 creates shipping info data block 362, which includes an item identifier ItemID_1, a sender's information, a recipient's information including geolocation address, and information for three intermediate shipping entities SHIPPER-A, SHIPPER-B and SHIPPER-C with a geolocation address for each. At 373, the sending entity delivers the item to SHIPPER-A.

When SHIPPER-A receives the item, intermediary server/client 380A is used to scan a shipping label on the item to obtain the item identifier ItemID_1 and the blockchain address for shipping info data block 362. At 376, server/client 380A invokes a Get_next_addr( ) method in block 362 for ItemID_1 with its private key to authenticate the request for the next address. If authentication of the request is successful, the geolocation address geo-addr-b for the next shipper SHIPPER-B is returned at 378 and SHIPPER-A delivers the item to SHIPPER-B.

When SHIPPER-B receives the item, intermediary server/client 380B is used to scan a shipping label on the item to obtain the item identifier ItemID_1 and the blockchain address for shipping info data block 362. At 382, server/client 380B invokes the Get_next_addr( ) method in block 362 for ItemID_1 with its private key to authenticate the request for the next address. If authentication of the request is successful, the geolocation address geo-addr-c for the next shipper SHIPPER-C is returned at 384 and SHIPPER-B delivers the item to SHIPPER-C.

When SHIPPER-C receives the item, intermediary server/client 380C is used to scan a shipping label on the item to obtain the item identifier ItemID_1 and the blockchain address for shipping info data block 362. At 386, server/client 380C invokes the Get_next_addr( ) method in block 362 for ItemID_1 with its private key to authenticate the request for the next address.

The shipping chain defined in block 362 has reached its final leg at this point. If authentication of the request is successful, when server/client 380C invokes the Get_next_addr( ) method at 386, a notification is sent, at 392, to recipient server/client 390. At 394, recipient server/client 390 authorizes release of the recipient's delivery information, e.g. recipient identifier RecID_1 and recipient geolocation address geo-addr-recipient. As a result, geo-addr-recipient is returned to server/client 380C, at 388, and SHIPPER-C delivers the item to the recipient at the recipient's geolocation address.

As noted above, some examples can provide for the recipient to define an alternative address for delivery in response to the notification of arrival of the item.

It will be readily appreciated that the disclosed technology enables complex and sophisticated shipping information to be defined for items. Many variations can be implemented that differ from the examples illustrated or go beyond the examples illustrated.

The shipping information illustrated above can be defined and determined in a variety of ways. For example, a seller user with administrative permissions can define the shipping information for an item and create the shipping information data blocks on a blockchain. In another example, a seller can provide the sender client/server the shipping information and the sender client/server can manage the shipping information data block on the blockchain.

Figure 4A:
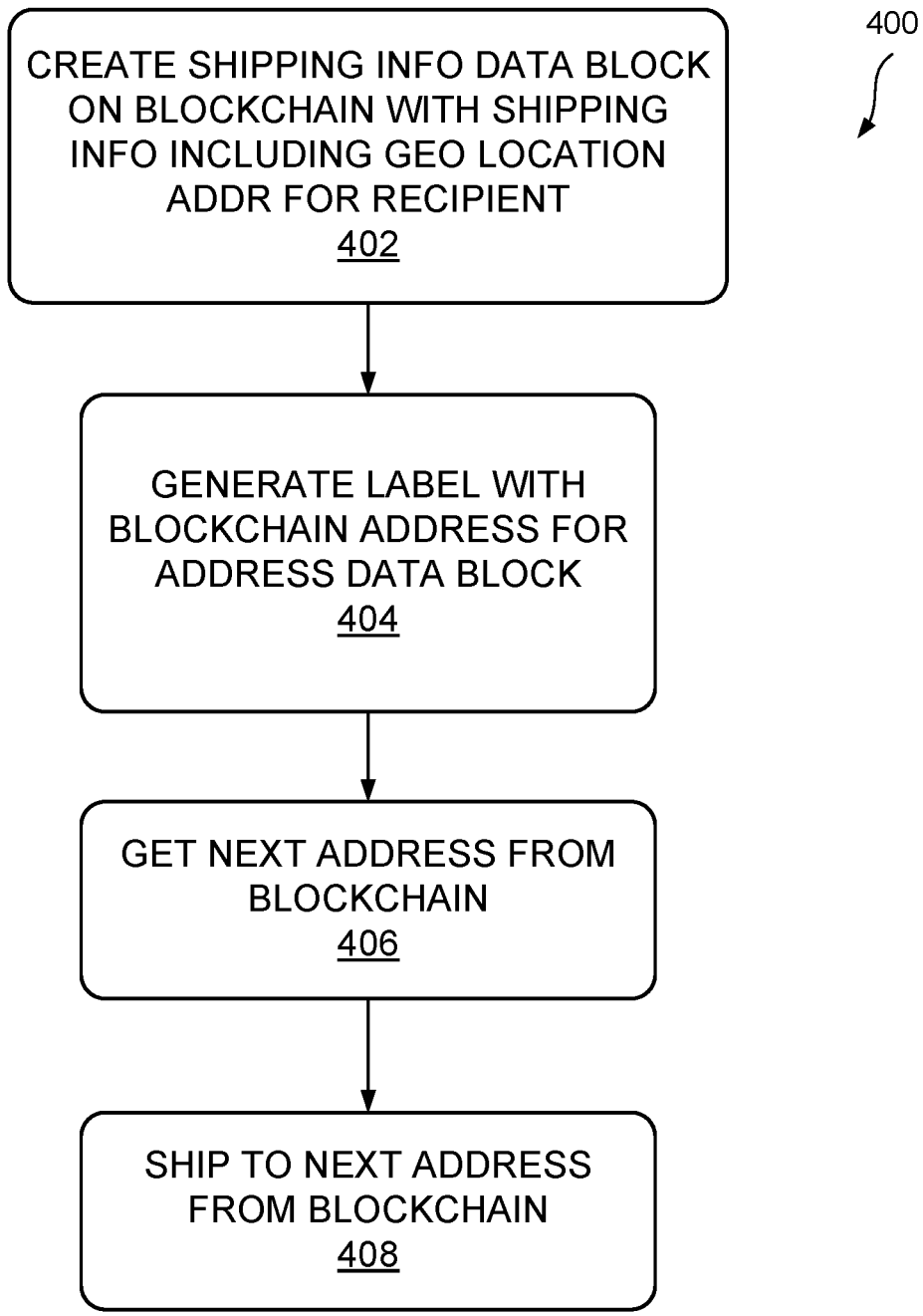
FIG. 4A is a control flow diagram showing an illustrative example of a process for a sender to initiate shipping that is consistent with the example of FIG. 3A for securing private information during shipping of an item using shipping information blockchain.

FIG. 4A is a control flow diagram showing an illustrative example of a process 400, such as a process in sender client/server 310, that is consistent with the example of FIG. 3A. In this example, shipping information is defined and distributed on a shipping information blockchain for use in securing private information during shipping of an item in accordance with certain aspects of the disclosed technology.

At 402, shipping information is defined or received for an item, such as is described above or in other ways as are suitable for a particular implementation, that can identify recipient and a geolocation address for the recipient as well as an identifier or geolocation address for one or more intermediate shipping entities. A shipping information data block that includes the shipping information is created on a shipping information blockchain, as described above. At 404, a label is generated for the item that identifies the item and provides a blockchain address for the shipping information data block. The label is attached to the item or package.

At 406, in this example, the sender gets the next address from the blockchain, e.g. invokes Get_next_address( ). At 408, the sender uses the next address from the blockchain to deliver the item to the next geolocation address in the shipping information for the item.

Figure 4B:
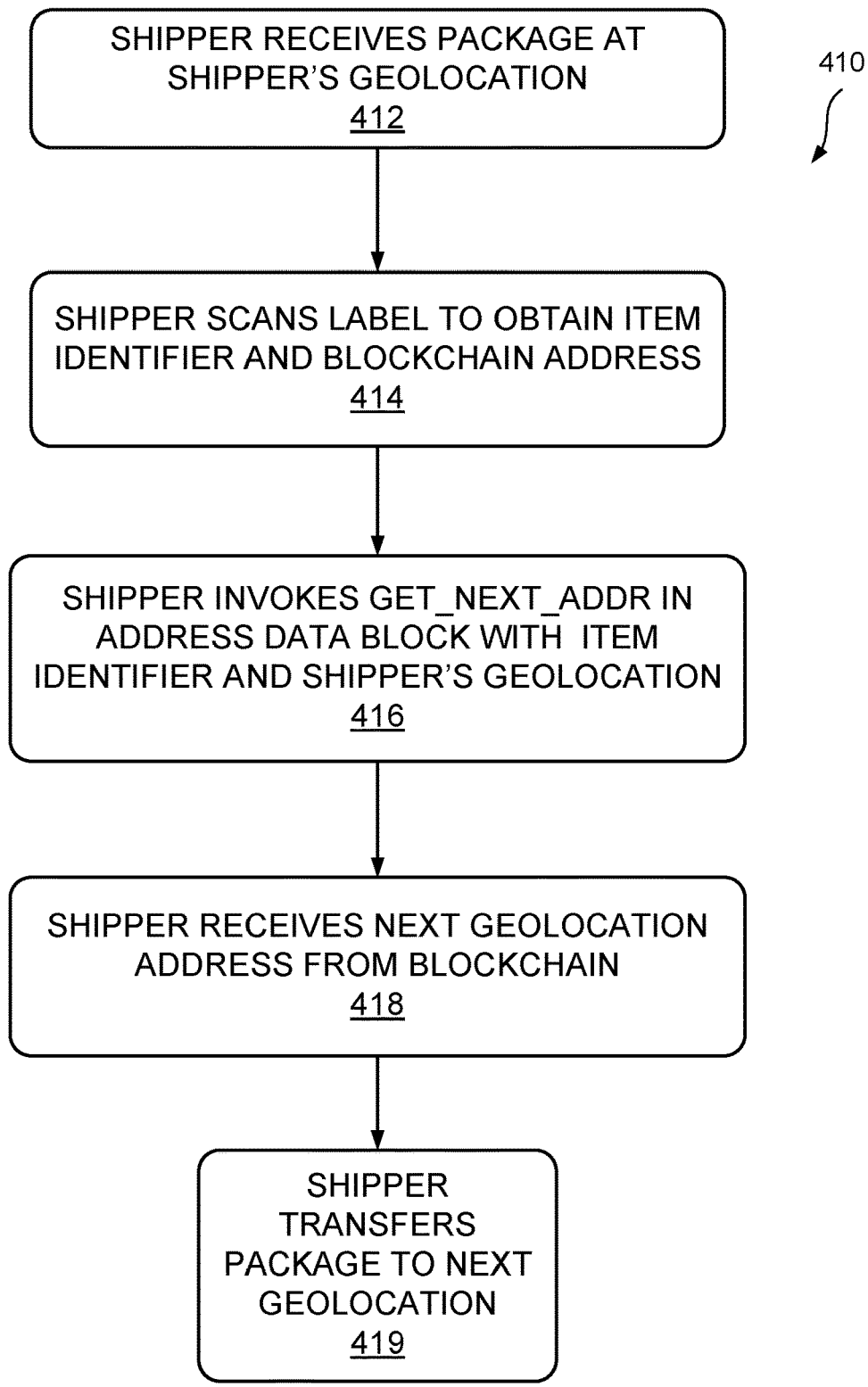
FIG. 4B is a control flow diagram showing an illustrative example of a process for an intermediate shipper in a shipping chain that is consistent with the example of FIG. 3A for securing private information during shipping of an item using shipping information blockchain.

FIG. 4B is a control flow diagram showing an illustrative example of a process 410, such as a process in intermediate shipper client/servers 320 in FIG. 3A, for processing a received item with a label pointing to shipping information for the item that is stored on a shipping information blockchain. At 412, the shipper receives the package at the shipper's geolocation, e.g. the geolocation address provided to the sender in FIG. 4A.

At 414, the shipper's client/server, such as client/servers 320, scans the label to obtain the item identifier and a blockchain address for a shipping information data block. At 416, using the blockchain address, the shipper's client/server invokes a method included in the shipping information data block, e.g. Get_next_addr( ), which may include the item identifier and the shipper's geolocation address. In some implementations, the shipper's client/server can provide information, such as data encrypted with a private key, to authenticate the shipper.

At 418, the shipper's client/server receives the next geolocation address from the shipping information blockchain for the item. At 419, the shipper transfers the item or package to the next geolocation address.

Figure 4C:
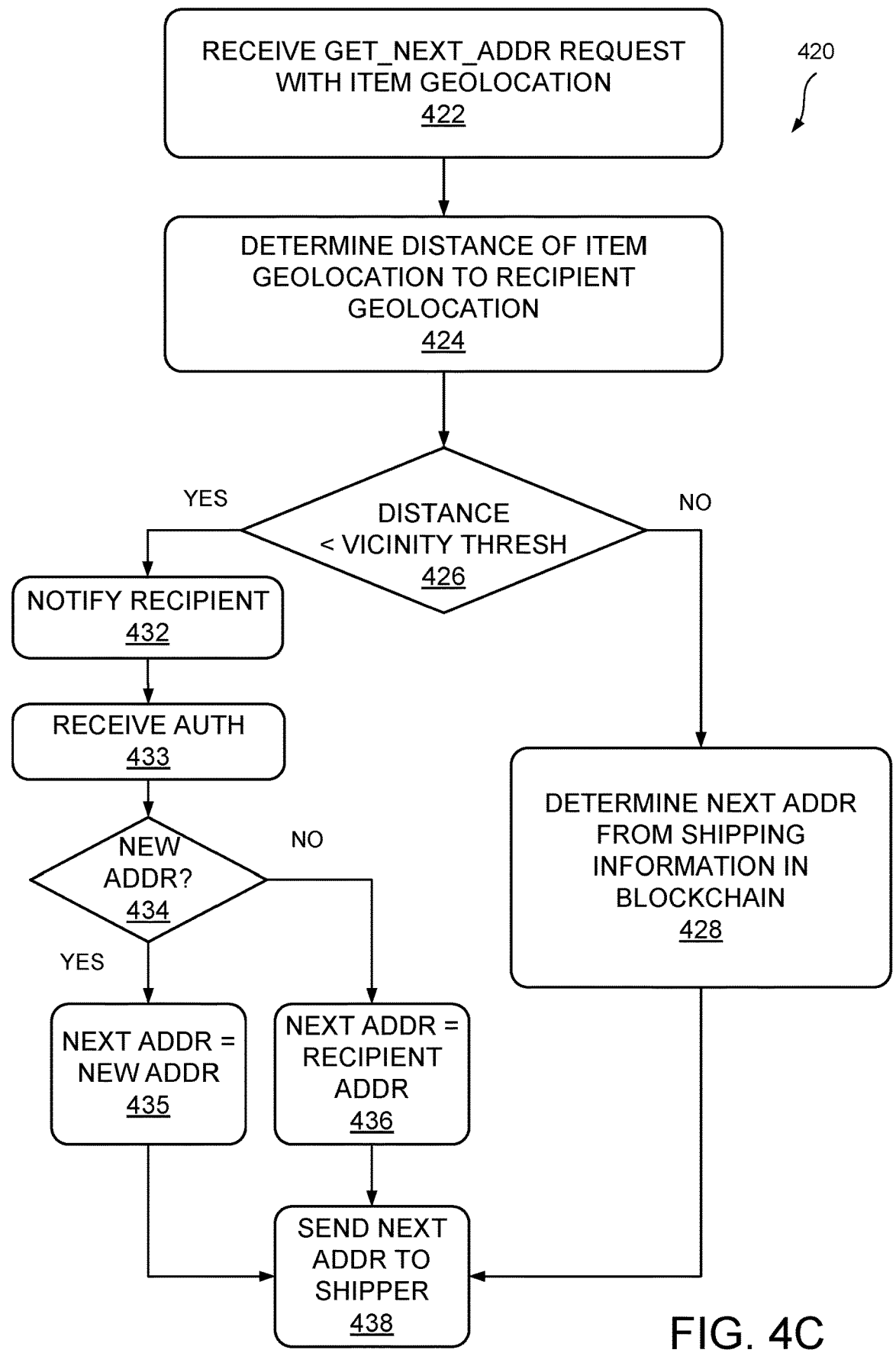
FIG. 4C is a control flow diagram showing an illustrative example of a process executing in a blockchain platform that is consistent with the example of FIG. 3A for securing private information during shipping of an item using shipping information blockchain.

FIG. 4C is a control flow diagram showing one illustrative example of a process 420 executing in a blockchain platform, such as blockchain platform 360, that is consistent with the example of FIGS. 2B and 3A for securing private information during shipping of an item using a shipping information blockchain.

At 422, a request for the next shipping address is received, e.g. the Get_next_addr( ) is invoked, that includes the geolocation of the item or shipper. In this example, at 424, the process determines a distance of the item or shipper's geolocation to the recipient's geolocation. Note that in some implementations, the geolocation data for the item or shipper and the recipient can be real time data to detect whether the shipper and recipient are close to one another. At 426, if the distance is not within a vicinity threshold, control branches to 428 to determine the next address based on the shipping information on the blockchain for the item.

If the distance is within the vicinity threshold, control branches to 432 to notify the recipient. At 433, a response from the recipient is checked to determine whether the recipient sent a new delivery address. If the recipient sent a new geolocation address, then control branches at 434 to 435 to set the next address to the new geolocation address sent by the recipient. If no new address was provided, then control branches to 436 to set the next address to the recipient's address stored in the blockchain for the item. At 438, the next address is returned to the shipper who invoked the Get_next_addr( ) method.

Figure 4D:
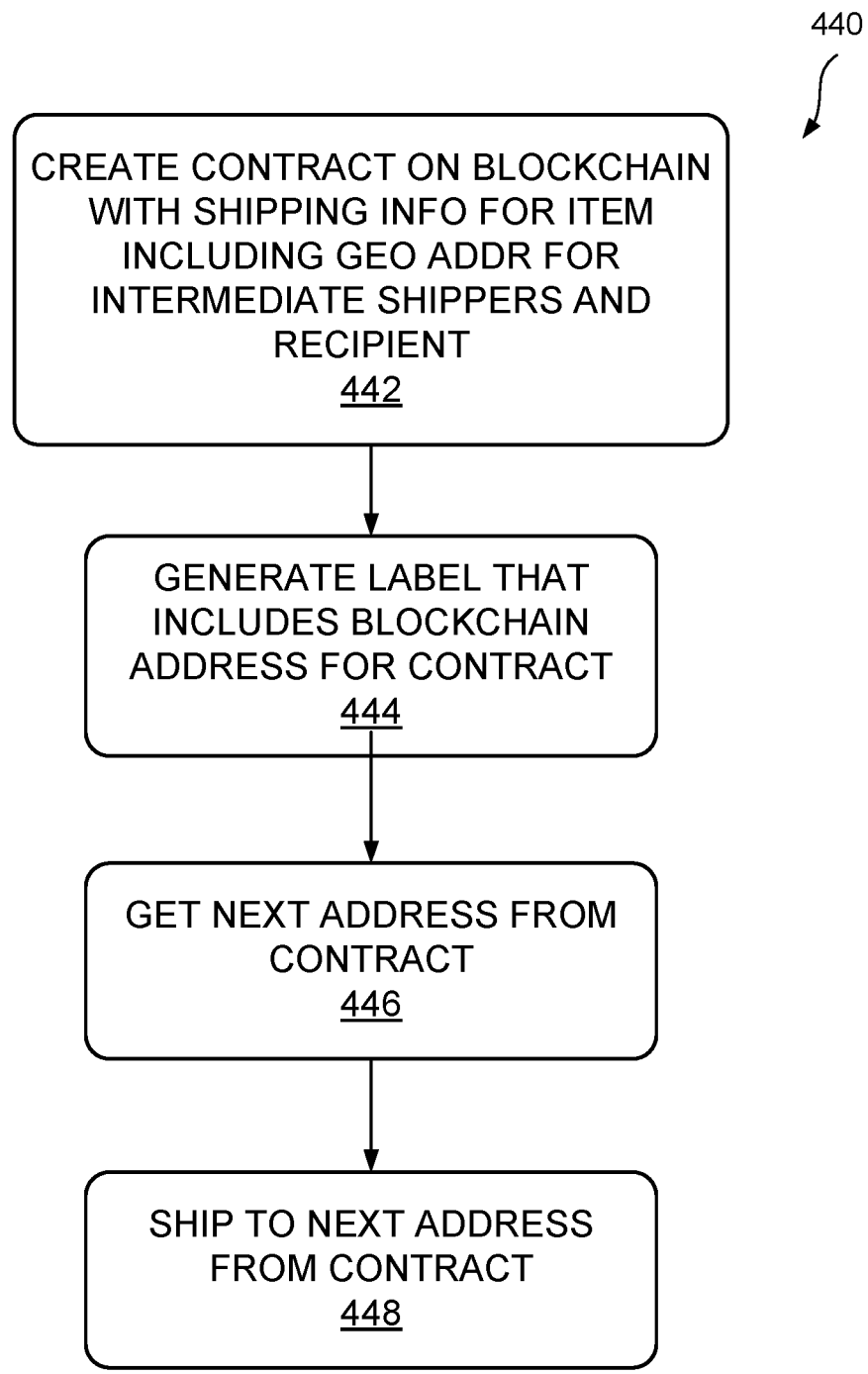
FIG. 4D is a control flow diagram showing an illustrative example of a process for a sender to initiate shipping that is consistent with the example of FIG. 3B for securing private information during shipping of an item using a blockchain contract.

FIG. 4D is a control flow diagram showing an illustrative example of a process 440, such as a process in sender client/server 370, for a sender to initiate shipping that is consistent with the example of FIGS. 2D and 3B for securing private information during shipping of an item using a blockchain contract.

At 442, a sender or other trusted entity creates a shipping information contract block on a blockchain that includes a geolocation address and public key for the sender, each intermediate shipper, and a recipient for the item. At 444, a label is generated that includes the blockchain address for the contract. At 446, the sender gets the next address from the contract and, at 448, ships the item to the next geolocation address from the contract.

Note that in some implementations, an identifier for an item with a shipping information data block on the blockchain may be superfluous if the shipping information data block is unique to the item. Also note that in other implementations a shipper identifier may be used in place of a geolocation address so that the item can be delivered to a nearby location associated with the shipper identifier, e.g. a local facility for a national carrier.

Figure 4E:
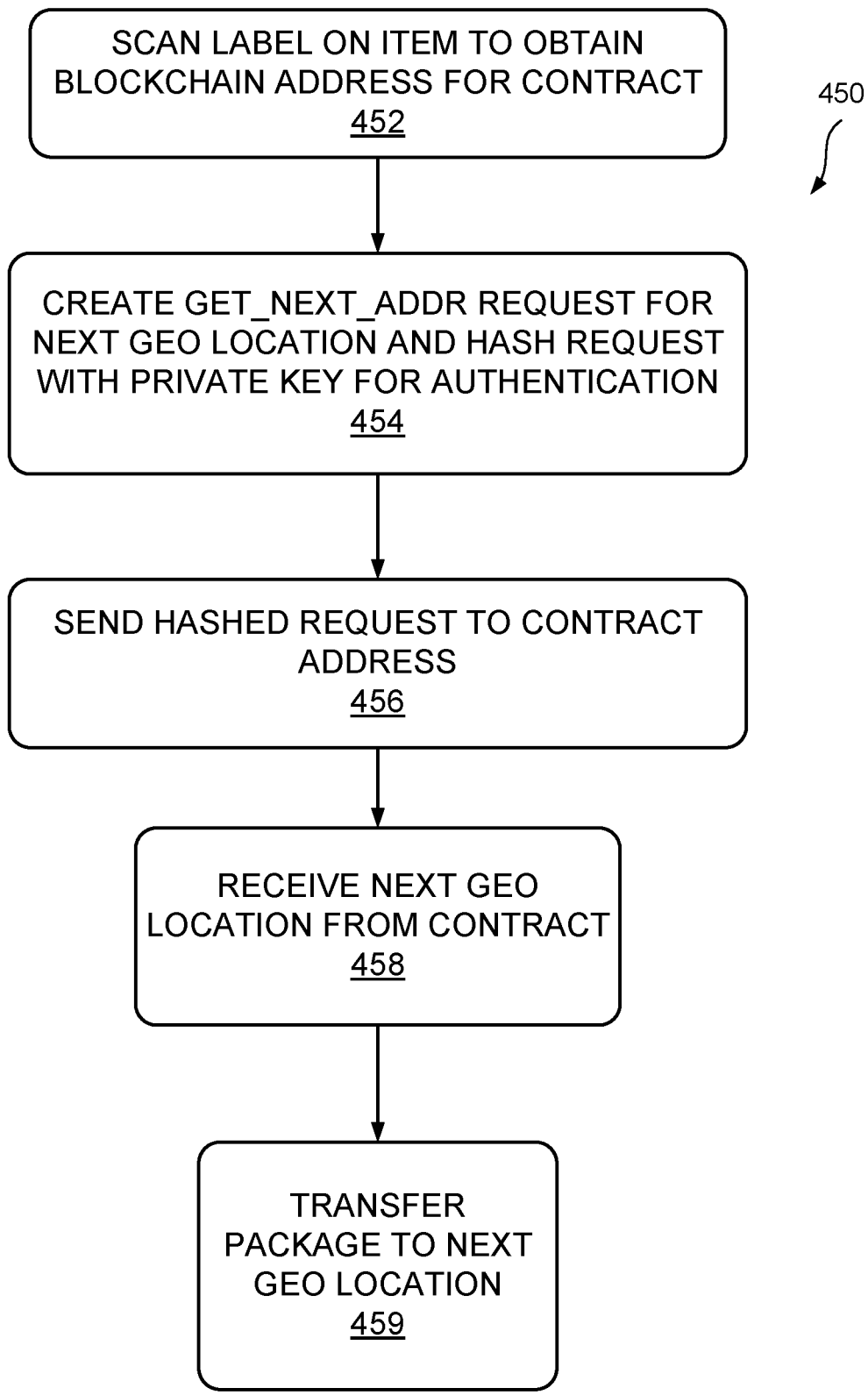
FIG. 4E is a control flow diagram showing an illustrative example of a process for an intermediate shipper in a shipping chain that is consistent with the example of FIG. 3B for securing private information during shipping of an item using a blockchain contract.

FIG. 4E is a control flow diagram showing an illustrative example of a process 450 in an intermediate shipper client/server, such as client/server 380, in a shipping chain that is consistent with the example of FIGS. 2D and 3B for securing private information during shipping of an item using a blockchain contract. When the shipper receives the package at the shipper's geolocation, e.g. the geolocation address provided to the sender in FIG. 4D, intermediate shipper client/server scans the label on the item or package to obtain the blockchain address for the contract.

At 454, the shipper client/server creates a Get_next_addr request or invocation of a method of the contract and uses the shipper's private key to hash the request or predetermined data within the request in order to authenticate the shipper to get access to the shipping information in the contract. At 456, the hashed request is sent to the contract address or the method is invoked with the hashed data.

At 458, if authentication is successful, the contract will return the next geolocation address for the shipping chain. At 459, the item or package is transferred or delivered to the next geolocation address received from the contract.

Figure 4F:
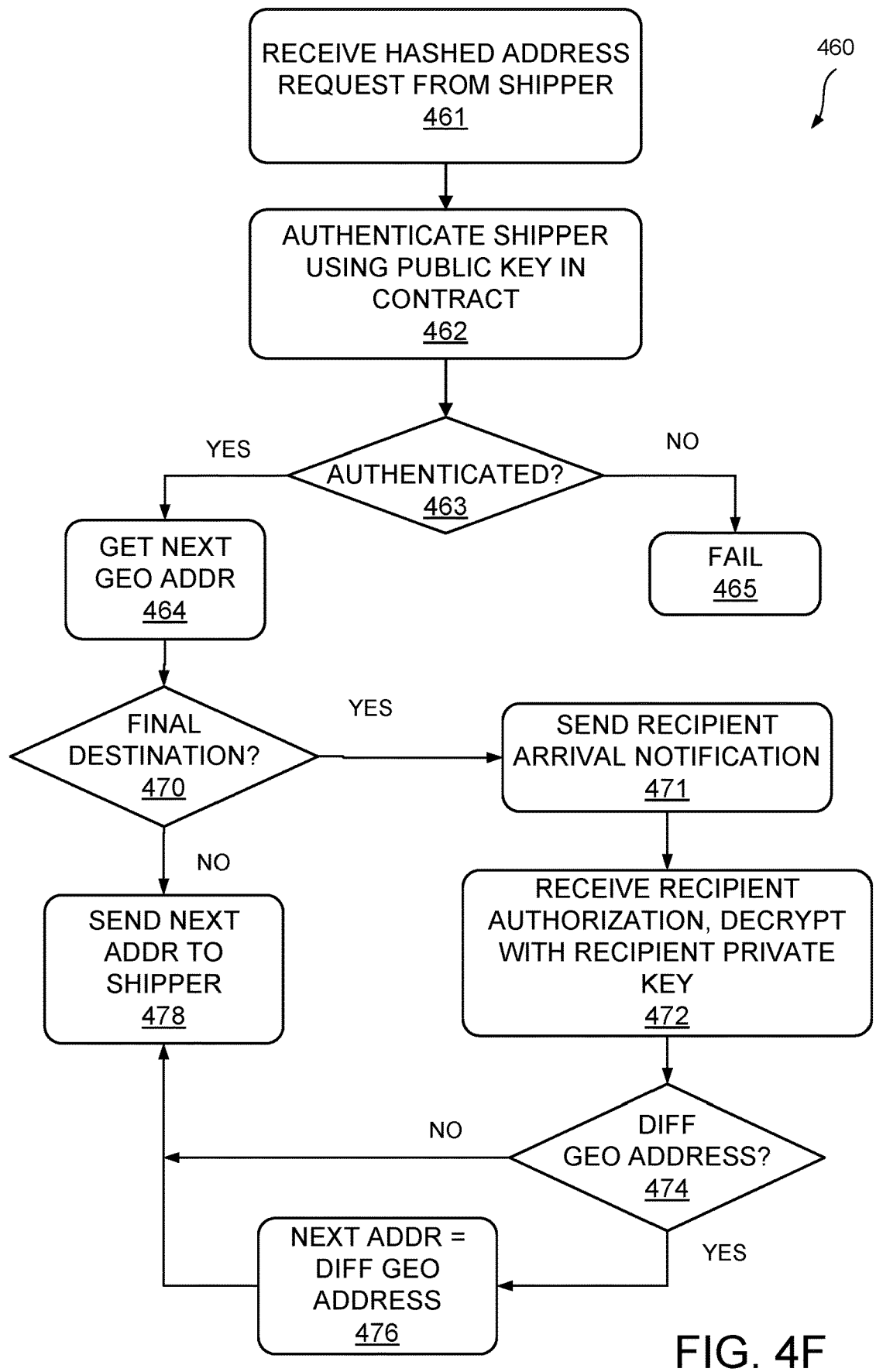
FIG. 4F is a control flow diagram showing an illustrative example of a process executing in a blockchain platform that is consistent with the example of FIG. 3B for securing private information during shipping of an item using a blockchain contract.

FIG. 4F is a control flow diagram showing an illustrative example of a process 460 executing on a blockchain platform, such as a blockchain platform that supports shipping information data block 362, that is consistent with the example of FIGS. 2D and 3B for securing private information during shipping of an item using a blockchain contract. At 461, the hashed address request or method invocation is received from the shipper. At 462, the shipper is authenticated using the shipper's public key stored in the contract. If authentication fails, control branches at 463 to 465, where the request is rejected. If authentication is successful, control branches to 464 to get the next geolocation address in the shipping chain from the shipping info in the contract.

At 470, a determination is made as to whether the next leg of the shipping chain is the final destination, i.e. the recipient. If the next leg is the final destination, then control branches to 471 to send the recipient an arrival notification. If the next leg is not the final destination, then control branches to 478 to send the geolocation address of the next shipper in the shipping chain as defined in the shipping information in the contract.

At 472, a recipient authorization is received and decrypted using the recipient's public key. At 474, if the authorization includes a different geolocation address for delivery, then control branches to 476 to set the next address to the different geolocation address from the authorization and continue to 478 to send the next address to the shipper. If a different address is not provided in the authorization, then control branches to 478 to send the recipient's geolocation address as defined in the shipping information in the contract.

Figure 4G:
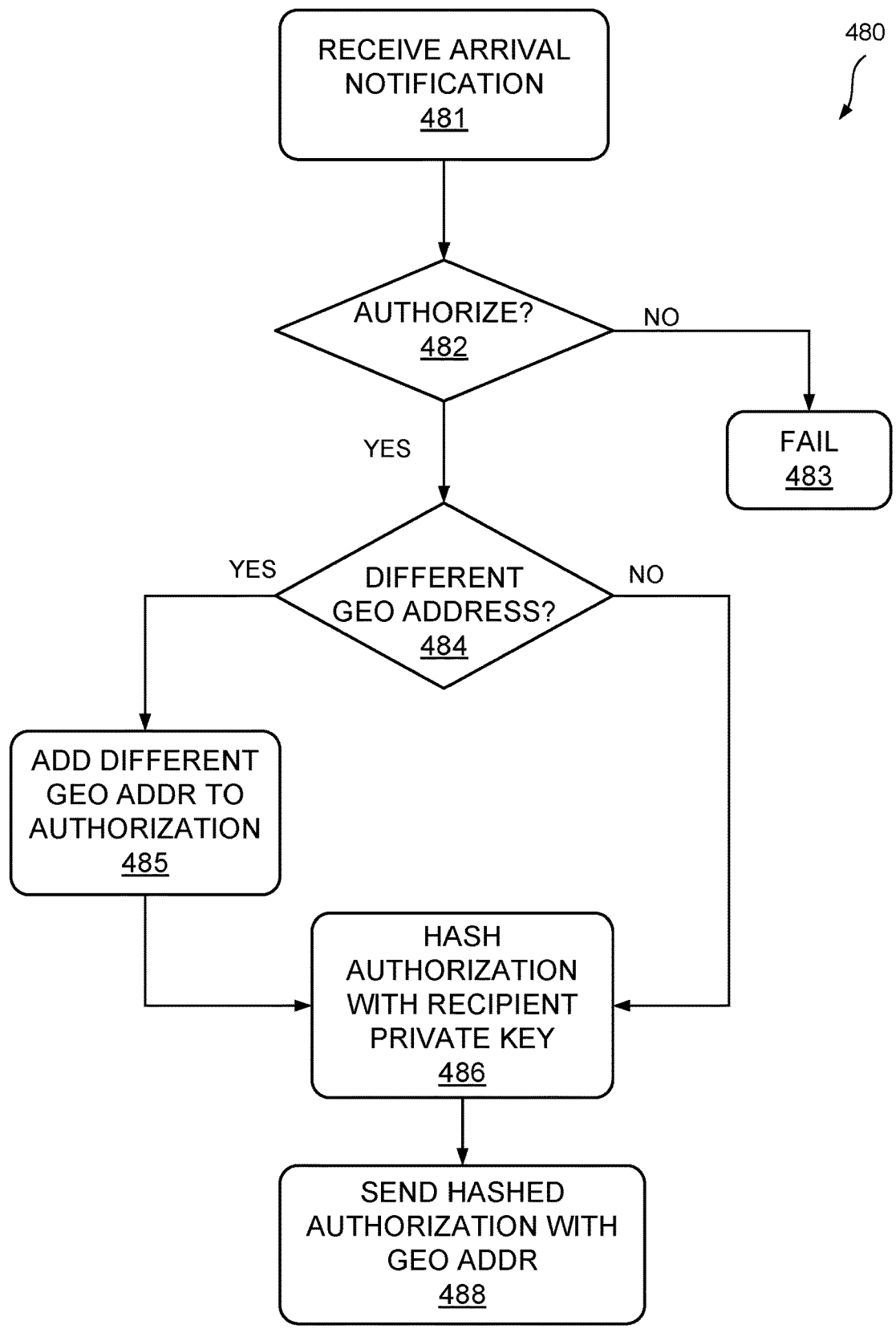
FIG. 4G is a control flow diagram showing an illustrative example of a process in a recipient's client for notification and authorizing release of a geolocation address for delivery to the recipient.

FIG. 4G is a control flow diagram showing an illustrative example of a process 480 in a recipient's client/server, such as recipient client/server 390, for notification and authorizing release of a recipient's geolocation address for delivery to the recipient that is consistent with the example of FIGS. 2D and 3B. At 481, an arrival notification for an item is received at the recipient's client/server. If the recipient does not wish to authorize the release of their geolocation address, then control branches at 482 to 483 to deny the authorization.

If the recipient does wish to authorize delivery of the item, then control branches to 484 to determine whether the recipient wishes to define a different geolocation address for delivery. If the recipient defines a different delivery address, then control branches to 485 to include the different geolocation delivery address in the authorization and control continues to 486, where the authorization is hashed using the recipient's private key for authentication purposes. If the recipient does not define a different delivery address, then control branches to 486 from 484. At 488, the hashed authorization is returned to the contract to be sent to the shipper's client/server.

The examples of FIGS. 4A-G illustrate a variety of approaches to controlling and distributing shipping information for use in shipping an item or package in accordance with certain aspects of the disclosed technology. It will be readily understood that other approaches can be utilized in accordance with the disclosed technology. Note that the disclosed technology can be implemented in varying ways to suit a particular implementation or design without departing from the teachings of the disclosed technology.

Figure 4H:
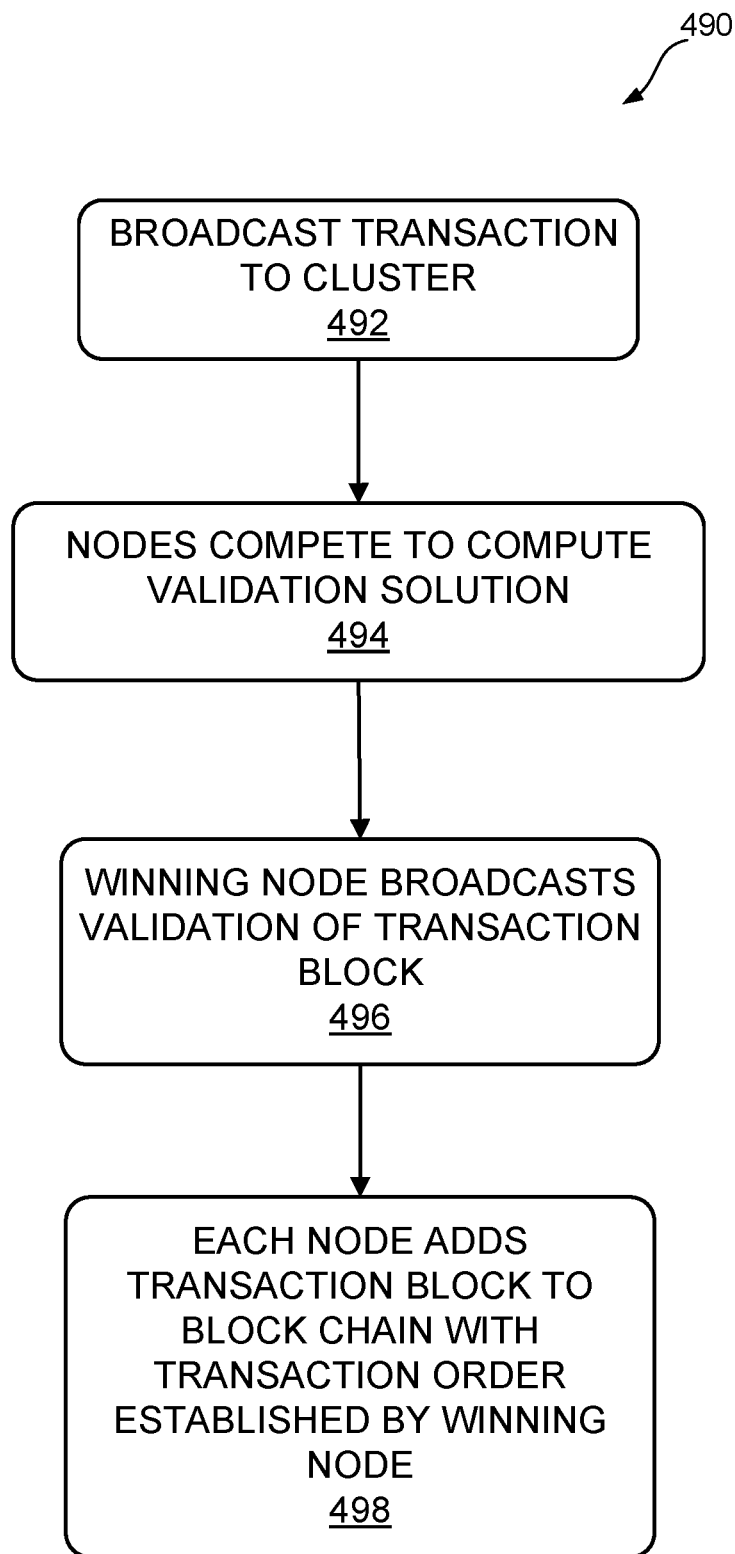
FIG. 4H is a control flow diagram illustrating an example of a validation process for blocks added to the shipping information data blockchain distributed to untrusted nodes.

FIG. 4H is a control flow diagram illustrating an example of a validation process 490 for blocks added to the shipping information blockchain ledger 140 of FIG. 1 or ledger 200 of FIG. 2A implemented using untrusted blockchain nodes. In process 490, when a shipping information data block 142 is created for shipping information blockchain 140, the transaction is broadcast, at 492, to the cluster of untrusted nodes. At 494, nodes compete to compute a validation solution for the transaction. At 496, a winning node broadcasts the validation solution for the shipping information data block or access control rule block and adds the data block to its copy of the corresponding data blockchain ledger, e.g. shipping information blockchain 140 in FIG. 1.

At 498, in response to the winning node's broadcast, the other nodes add the shipping information data block or access control rule block to their copy of the shipping information blockchain ledger in the transaction order established by the winning node. The decentralized validation protocol can maintain the integrity, immutability and security of the shipping information data blockchain ledger or shipping information blockchain ledger.

It should be appreciated that the processes shown for examples and a variety of other approaches may be utilized without departing from the disclosed technology.

Depending upon the scripting capabilities of the blockchain platform, the methods or function in the data blocks of the shipping information data blockchain may include more extensive code execution. For example, a shipping information system that provides for shared access to the shipping information by multiple users may involve more extensive code execution capability in the blockchain than a shipping information system that limits access to a single user, such as sender client/server 110. Such a shipping information system may involve shipping information being stored using shipping information data blocks that include executable methods that control access to the shipping information or modification of the shipping information.

It should be appreciated that the utilization of authentication utilizing service permissions bound to an item or package with shipping information can provide a high degree of flexibility, complexity and variation in the configuration of implementations without departing from the teaching of the disclosed technology.

Figure 5:
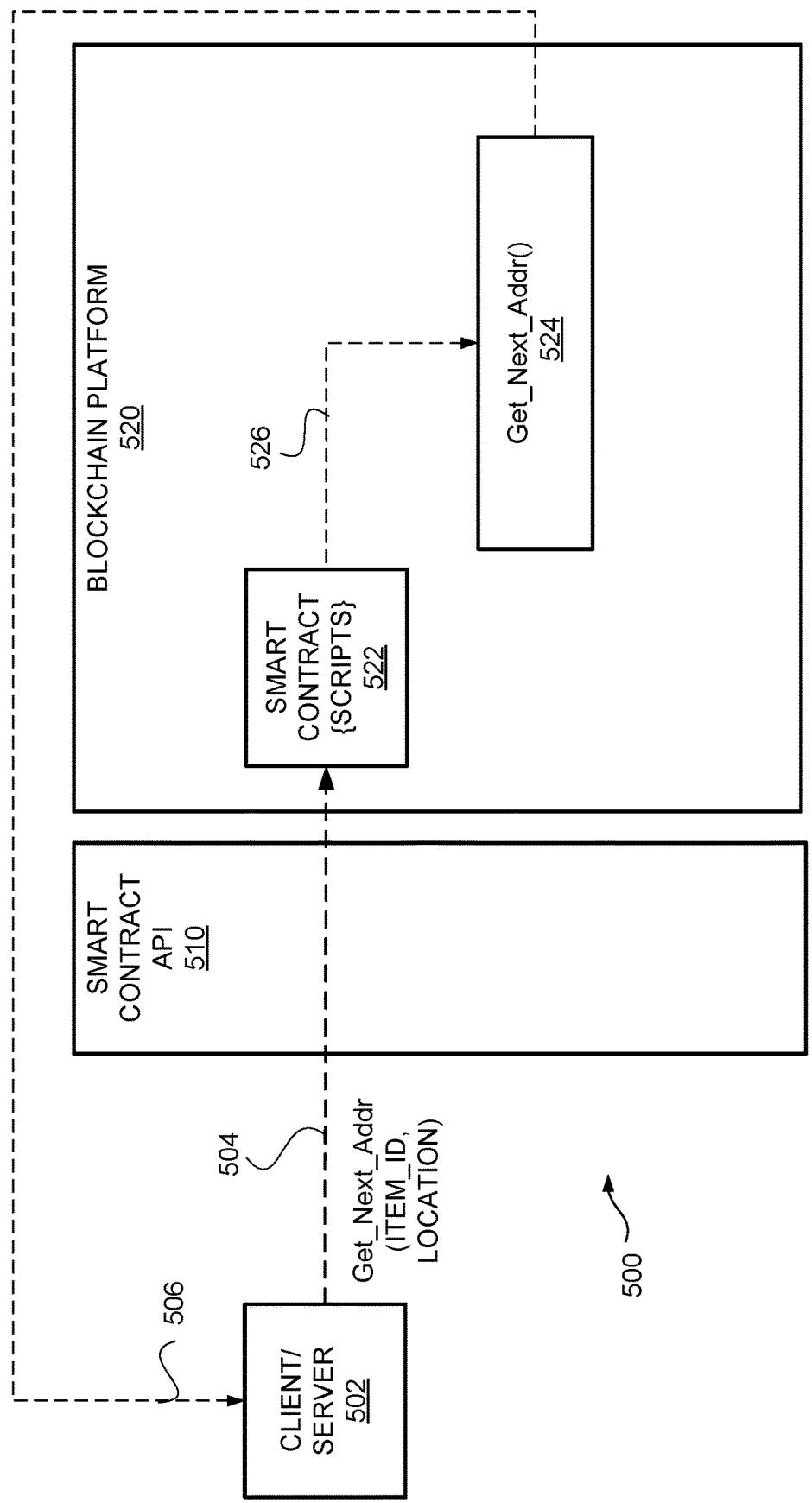
FIG. 5 is a data architecture diagram showing an illustrative example of a user using an application programming interface to invoke a method in a shipping information data block on shipping information blockchain.

FIG. 5 is a data architecture diagram showing an illustrative example of an interface for accessing shipping information in shipping information blockchain on a blockchain platform, such as the shipping information data blocks in FIGS. 1, 2A, 3A and 3B. In this example, an Application Program Interface (API) 510 provides an interface to the blockchain platform 520 that supports the shipping information blockchain. The blockchain platform 520 supports a smart contract 522, such as shipping information data block 142 in FIG. 1, which includes a Get_Next_Addr( ) script 524 with code that, when executed by the blockchain platform 520 in response to a request 504 from client/server 502, operates to obtain shipping information for an item that is stored on the shipping information blockchain and return the shipping information 506 to client/server 502.

Blockchain Ledger Data Structure

Figure 6A:
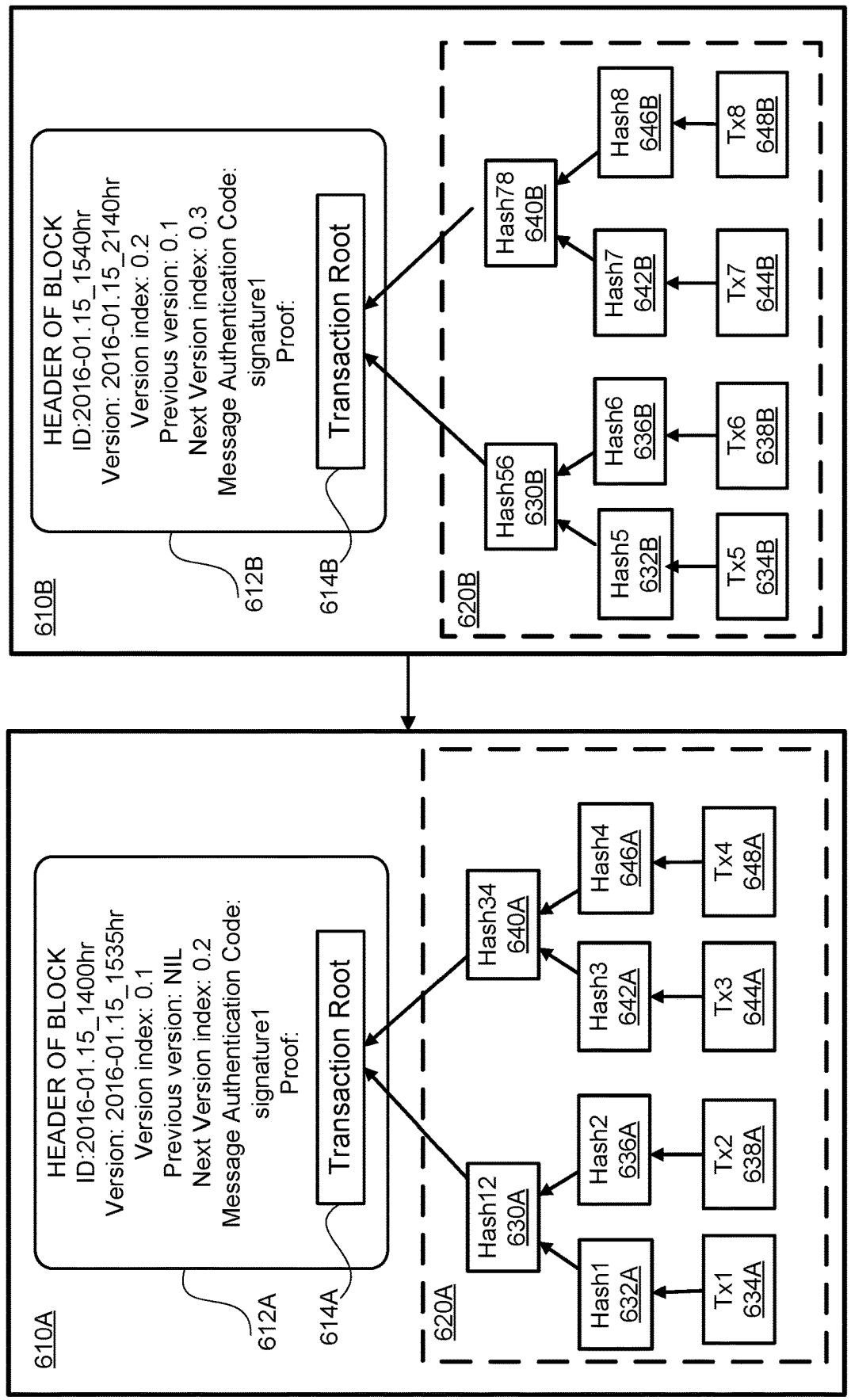
FIG. 6A is a data architecture diagram illustrating a simplified example of a blockchain ledger based on the shipping information data blocks of the shipping information blockchain of FIG. 1.

FIG. 6A is a data architecture diagram illustrating a simplified example of a blockchain ledger 600 based on the blocks 142A-E of the shipping information data blockchain 140 of FIG. 1. The blockchain ledger 600 example of FIG. 6A is simplified to show block headers, metadata and signatures of blocks 142A-E in order to demonstrate a shipping information ledger using a blockchain. In outline, a blockchain ledger may be a globally shared transactional database.

FIG. 6A is an illustrative example of a blockchain ledger 600 with a data tree holding shipping information that is verified using cryptographic techniques. In FIG. 6A, each block 610 includes a block header 612 with information regarding previous and subsequent blocks and stores a transaction root node 614 to a data tree 620 holding transactional data. Shipping information may store smart contracts, data related to transactions, or any other data. The elements of smart contracts may also be stored within transaction nodes of the blocks.

In the example of FIG. 6A, a Merkle tree 620 is used to cryptographically secure the shipping information. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
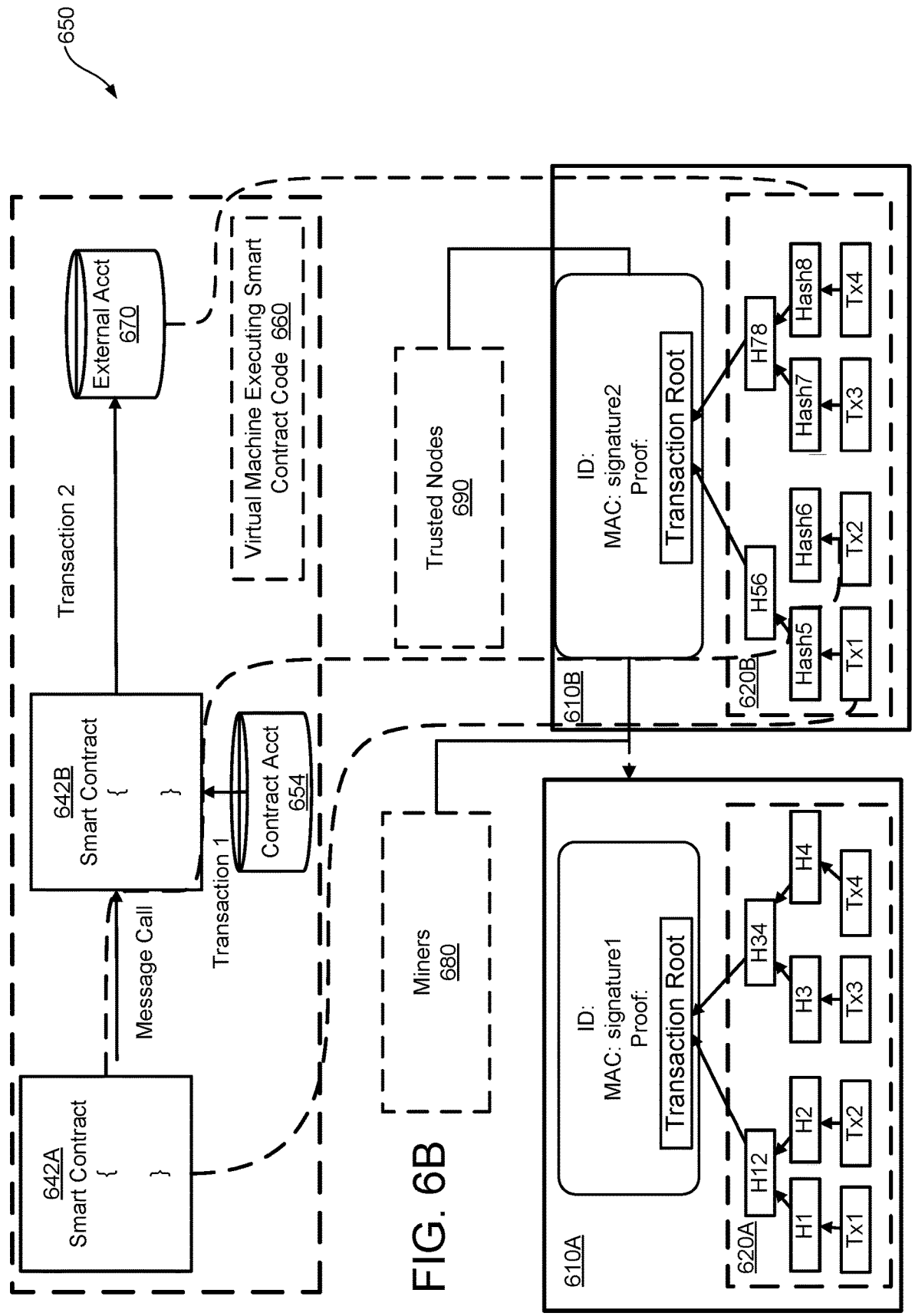
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in shipping information nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Shipping Information in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates shipping information, the shipping information must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as Sender client/server 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a shipping information data block 142 for shipping information data blockchain 140, the block is an unconfirmed and unidentified entity. To be part of the acknowledged "currency", it may be added to the blockchain, and therefore relates to the concept of a trusted cluster.

In a trusted cluster, when a data block 142 is added, every node competes to acknowledge the next "transaction" (e.g. a new shipping information or access control rule block). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

The mining process, such as may be used in concert with the validation process 490 of FIG. 4H, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 492, to the network using software. Mining nodes compete, at 494, to compute a validation solution to validate transactions, and then broadcast, at 496, the completed block validation to other nodes. Each node adds the block, at 498, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the shipping information blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource and access control rule on a blockchain can be restricted by cryptographic means to be only open to authorized servers. Since the shipping information or shipping information blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a shipping information blockchain ledger. The specific examples of different aspects of a shipping information blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, shipping information executed and generated by smart contracts may be stored in the blockchain ledger in the ways previously described.

Computer Architectures for Use of Smart Contracts and Blockchain Ledgers

Figure 8:
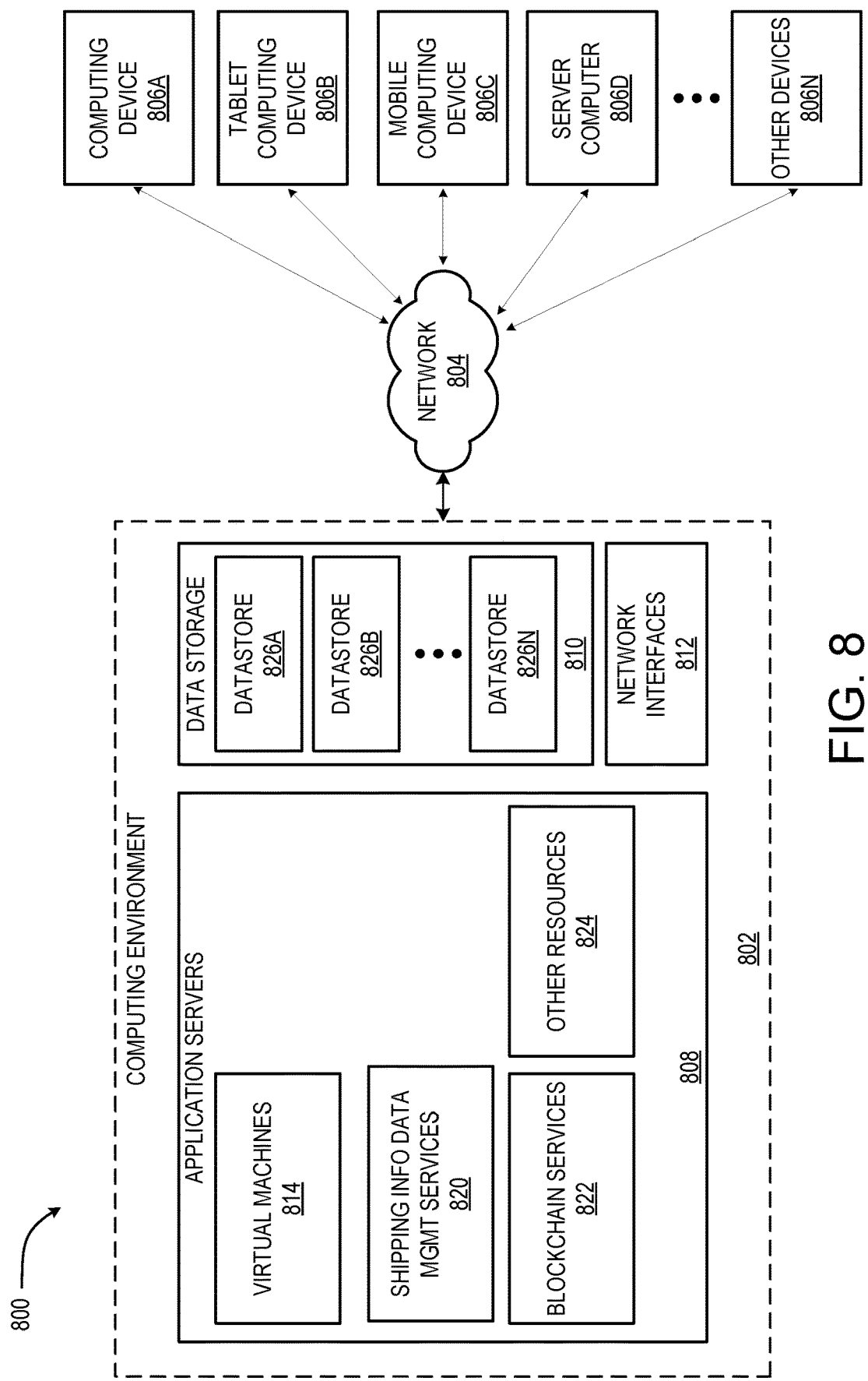
FIG. 8 is a diagram illustrating a distributed computing environment capable of implementing aspects of the techniques and technologies presented herein.

Note that at least parts of processes of FIGS. 4A-H, smart contract 522 of FIG. 5, smart contracts 642 of FIG. 6B, and other processes and operations pertaining to shipping information blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the shipping information blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes of FIGS. 4A-H, smart contract 522 of FIG. 5, smart contracts 642 of FIG. 6B) are described herein as being implemented, at least in part, by an application, component, and/or circuit. Although the following illustration refers to the components of FIGS. 4A-H, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes of FIGS. 4A-H, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
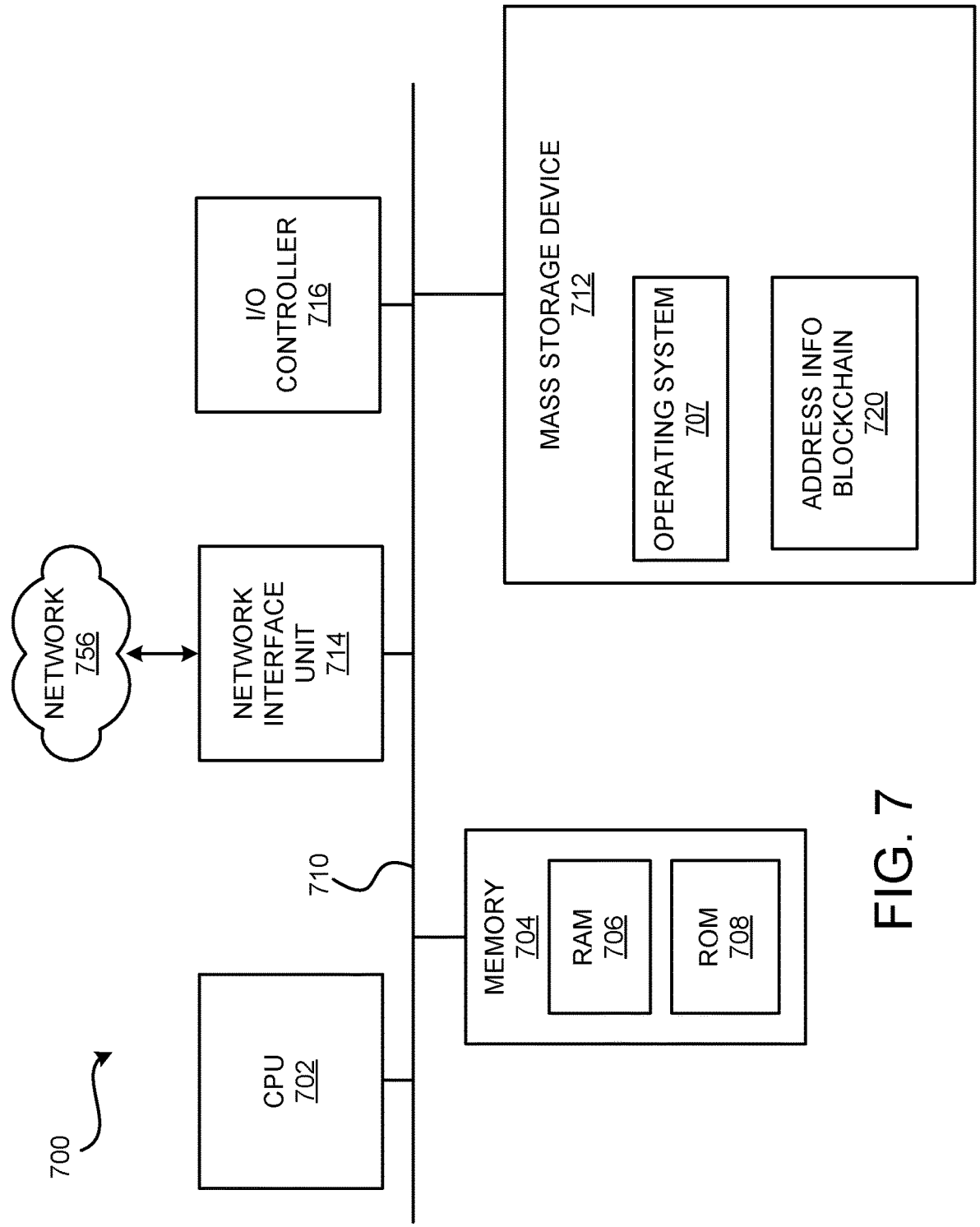
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of shipping information blockchain data 720), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for system level authentication utilizing service permissions bound to an item or package for a blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 856, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

The application servers 808 can also host shipping information data management services module 820, such as those described with respect to client/servers 320 of FIG. 3A or, client/servers 380 of FIG. 3B. Shipping information data management services module 820 can obtain shipping information from the shipping information blockchain responsive to requests from entities executing in virtual machines 814. According to various implementations, the application servers 808 also include one or more blockchain services 822.

The shipping information management services 820 can include services for managing shipping information on a shipping information blockchain, such as shipping information blockchain 140 in FIG. 1. The blockchain services 822 can include services for participating in management of one or more blockchains, such as by creating genesis blocks or shipping information data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a shipping information blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a shipping information blockchain ledger, among other aspects.

Figure 9:
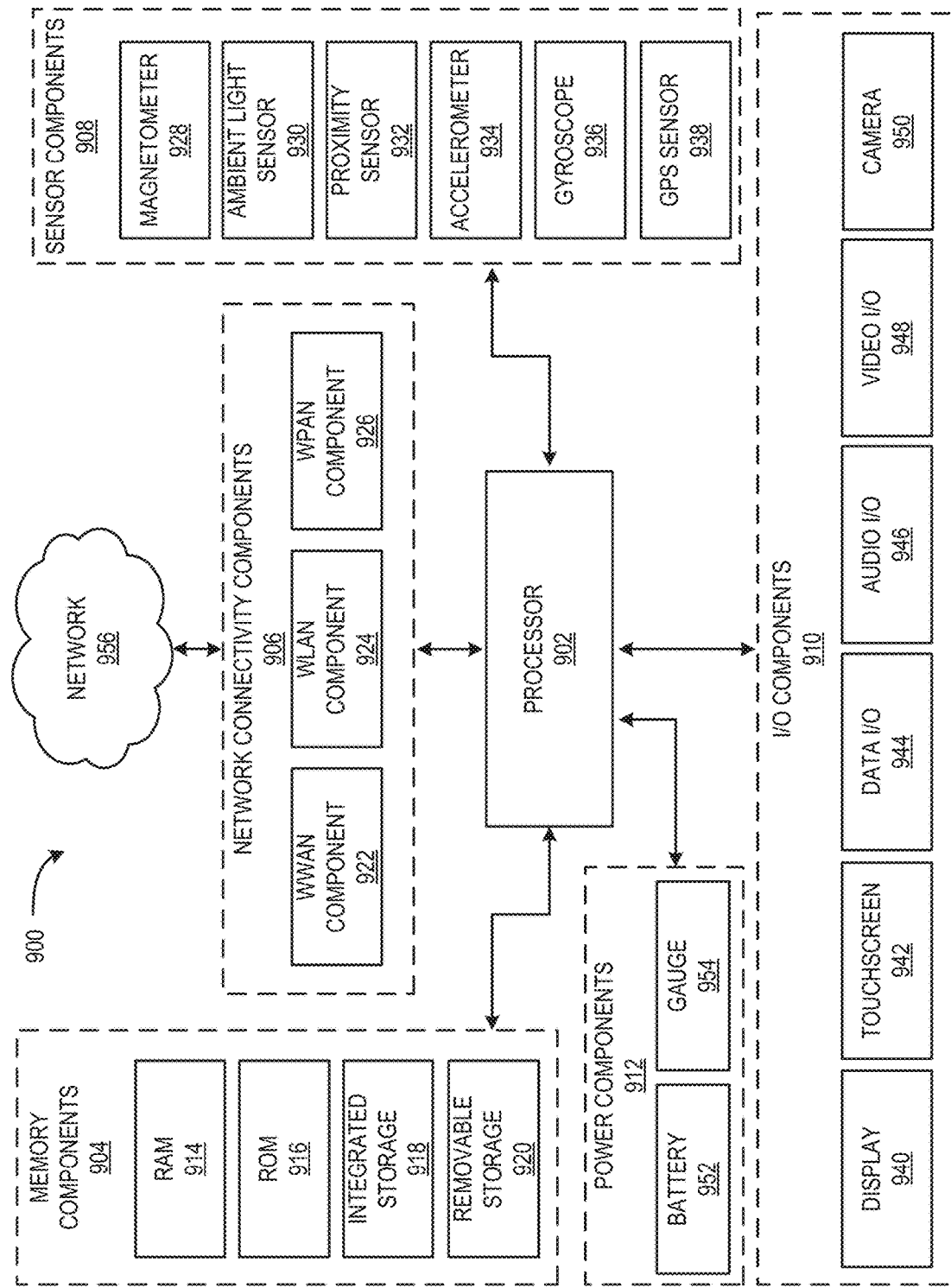
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for supporting a blockchain ledger and applying shipping information to the blockchain ledger. The computing device architecture 900 is applicable to computing devices that can manage a blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the Sender client/server 110, client/servers 120A-C, recipient client/server 130, and blockchain platform 160 shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:
1. A method for securing private information during shipping of an item, the method comprising:
  storing shipping information for an item on a blockchain at a blockchain address, the shipping information including a recipient geolocation address and a first authentication key;
  labeling the item with a shipping label that includes a machine-readable pointer to the blockchain address;
  during transit of the item to the recipient geolocation address, receiving a delivery modification request that specifies a new recipient geolocation address for the item;

creating a shipping information block that modifies the recipient geolocation address to the new recipient geolocation address in the shipping information without altering the machine-readable pointer to the blockchain address;

during transit of the item, receiving a request for the shipping information from a shipping agent that includes the blockchain address and the first authentication key; and during transit of the item, providing the new recipient geolocation address to the shipping agent responsive to the request for shipping information.

2. The method of claim 1, further comprising authenticating the shipping agent using the first authentication key included in the request, wherein providing the new recipient geolocation address to the shipping agent is performed responsive to authenticating the shipping agent.

3. The method of claim 2, wherein authenticating the shipping agent comprises decrypting the request and using the first authentication key.

4. The method of claim 1, further comprising:
sending a notification to a recipient of the item, the notification indicating that the request for the shipping information was received; and
receiving an authorization from the recipient responsive to the notification, wherein providing the recipient geolocation address to the shipping agent is performed responsive to receiving the authorization from the recipient.

5. The method of claim 4, wherein the authorization from the recipient includes a recipient defined alternate geolocation address and providing the recipient geolocation address to the shipping agent comprises changing the recipient geolocation address to the recipient defined alternate geolocation address before providing the recipient geolocation address to the shipping agent.

6. The method of claim 1, wherein the shipping information specifies at least one intermediate geolocation address for transporting the item, the method further comprising:
receiving an additional request for the shipping information that includes the machine-readable pointer of the shipping label from a different shipping agent during transit of the item; and
during transit of the item, providing the new recipient geolocation address to the different shipping agent responsive to the additional request.

7. The method of claim 6, wherein storing the shipping information for the item in the blockchain includes storing a second authentication key and the additional request for the shipping information includes the second authentication key, the method further comprising authenticating the different shipping agent using the second authentication key, wherein providing the new recipient geolocation address to the different shipping agent is performed responsive to authenticating the different shipping agent.

8. A computer-readable storage medium storing instructions that are executable by at least one processing device to perform operations comprising:
storing shipping information for an item on a blockchain at a blockchain address, the shipping information including a recipient geolocation address and a first authentication key;
labeling the item with a shipping label that includes a machine-readable pointer to the blockchain address;

during transit of the item to the recipient geolocation address, receiving a delivery modification request that specifies a new recipient geolocation address for the item;

creating a shipping information block that modifies the recipient geolocation address to the new recipient geolocation address in the shipping information without altering the machine-readable pointer to the blockchain address;

during transit of the item, receiving a request for the shipping information from a shipping agent that includes the blockchain address and the first authentication key; and during transit of the item, providing the new recipient geolocation address to the shipping agent responsive to the request for shipping information.

9. The computer-readable storage medium of claim 8, the operations further comprising authenticating the shipping agent using the first authentication key included in the request, wherein providing the new recipient geolocation address to the shipping agent is performed responsive to authenticating the shipping agent.

10. The computer-readable storage medium of claim 9, wherein authenticating the shipping agent comprises decrypting the request and using the first authentication key.

11. The computer-readable storage medium of claim 8, the operations further comprising:
sending a notification to a recipient of the item, the notification indicating that the request for the shipping information was received; and
receiving an authorization from the recipient responsive to the notification, wherein providing the recipient geolocation address to the shipping agent is performed responsive to receiving the authorization from the recipient.

12. The computer-readable storage medium of claim 11, wherein the authorization from the recipient includes a recipient defined alternate geolocation address and providing the recipient geolocation address to the shipping agent comprises changing the recipient geolocation address to the recipient defined alternate geolocation address before providing the recipient geolocation address to the shipping agent.

13. The computer-readable storage medium of claim 8, wherein the shipping information specifies at least one intermediate geolocation address for transporting the item, the operations further comprising:
receiving an additional request for the shipping information that includes the machine-readable pointer of the shipping label from a different shipping agent during transit of the item; and
during transit of the item, providing the new recipient geolocation address to the different shipping agent responsive to the additional request.

14. A system comprising:
one or more processors; and
a computer-readable storage medium storing instructions that, when executed by the one or more processors, cause the one or more processors to perform operations comprising:
storing shipping information for an item on a blockchain at a blockchain address, the shipping information including a recipient geolocation address and a first authentication key;
labeling the item with a shipping label that includes a machine-readable pointer to the blockchain address;

during transit of the item to the recipient geolocation address, receiving a delivery modification request that specifies a new recipient geolocation address for the item;

creating a shipping information block that modifies the recipient geolocation address to the new recipient geolocation address in the shipping information without altering the machine-readable pointer to the blockchain address;

during transit of the item, receiving a request for the shipping information from a shipping agent that includes the blockchain address and the first authentication key; and during transit of the item, providing the new recipient geolocation address to the shipping agent responsive to the request for shipping information.

15. The system of claim 14, the operations further comprising authenticating the shipping agent using the first authentication key included in the request, wherein providing the new recipient geolocation address to the shipping agent is performed responsive to authenticating the shipping agent.

16. The system of claim 15, wherein authenticating the shipping agent comprises decrypting the request and using the first authentication key.

17. The system of claim 14, the operations further comprising:

sending a notification to a recipient of the item, the notification indicating that the request for the shipping information was received; and receiving an authorization from the recipient responsive to the notification, wherein providing the recipient geolocation address to the shipping agent is performed responsive to receiving the authorization from the recipient.

18. The system of claim 17, wherein the authorization from the recipient includes a recipient defined alternate geolocation address and providing the recipient geolocation address to the shipping agent comprises changing the recipient geolocation address to the recipient defined alternate geolocation address before providing the recipient geolocation address to the shipping agent.

19. The system of claim 14, wherein the shipping information specifies at least one intermediate geolocation address for transporting the item, the operations further comprising:

receiving an additional request for the shipping information that includes the machine-readable pointer of the shipping label from a different shipping agent during transit of the item; and during transit of the item, providing the new recipient geolocation address to the different shipping agent responsive to the additional request.

20. The system of claim 19, wherein storing the shipping information for the item in the blockchain includes storing a second authentication key and the additional request for the shipping information includes the second authentication key, the operations further comprising authenticating the different shipping agent using the second authentication key, wherein providing the new recipient geolocation address to the different shipping agent is performed responsive to authenticating the different shipping agent.

* * * * *